United States Patent
Bao et al.

(10) Patent No.: US 12,289,703 B2
(45) Date of Patent: Apr. 29, 2025

(54) PERIODIC POSITIONING REPORT ENHANCEMENT

(71) Applicant: QUALCOMM Incorporated, San Diego, CA (US)

(72) Inventors: Jingchao Bao, San Diego, CA (US); Sony Akkarakaran, Poway, CA (US)

(73) Assignee: QUALCOMM Incorporated, San Diego, CA (US)

( * ) Notice: Subject to any disclaimer, the term of this patent is extended or adjusted under 35 U.S.C. 154(b) by 735 days.

(21) Appl. No.: 17/449,606

(22) Filed: Sep. 30, 2021

(65) Prior Publication Data

US 2023/0102893 A1    Mar. 30, 2023

(51) Int. Cl.
*H04W 64/00* (2009.01)
(52) U.S. Cl.
CPC ................... *H04W 64/00* (2013.01)
(58) Field of Classification Search
None
See application file for complete search history.

(56) References Cited

U.S. PATENT DOCUMENTS

| 2018/0343635 A1* | 11/2018 | Edge | G01S 5/0036 |
| 2023/0397151 A1* | 12/2023 | Meng | H04W 64/00 |

FOREIGN PATENT DOCUMENTS

| WO | 2020093358 A1 | 5/2020 |

OTHER PUBLICATIONS

International Search Report and Written Opinion—PCT/US2022/039825—ISA/EPO—Dec. 8, 2022.
Qualcomm Incorporated: "Corrections to NR Positioning", 3GPP TSG-RAN WG2 Meeting #110-e, RP-201175 (R2-2005910), 3rd Generation Partnership Project (3GPP), Mobile Competence Centre, 650, Route Des Lucioles, F-06921 Sophia-Antipolis Cedex, France, vol. RAN WG2, No. Online, Jun. 1, 2020-Jun. 12, 2020, 65 Pages, Jun. 25, 2020 (Jun. 25, 2020), XP051906089, Section 8.10.4.
Qualcomm Incorporated: "Stage 2 for Multi-RTT Positioning", 3GPP TSG-RAN WG2 Meeting #108, R2-1915558, 3rd Generation Partnership Project (3GPP), Mobile Competence Centre, 650, Route Des Lucioles, F-06921, Sophia-Antipolis Cedex, France, vol. RAN WG2, No. Reno, Nevada, USA, Nov. 18, 2019-Nov. 22, 2019, Nov. 8, 2019 (Nov. 8, 2019), XP051817272, 19 Pages, pp. 1-11, p. 2, paragraph 1 and 2, p. 12, paragraph 3.1, paragraph [8.x.2. 2], figures 8.x.3.1.3.1-1, Section 2.

* cited by examiner

*Primary Examiner* — Suhail Khan
(74) *Attorney, Agent, or Firm* — QUALCOMM Incorporated

(57) ABSTRACT

Method and apparatus for a configuration for period positioning report enhancement. The apparatus obtains an indication of at least one of measurement instance related information or expiration time related information associated with a measurement of PRS for the location information report or transmission of the location information report. The apparatus generates the location information report based on a PRS received at the UE. The apparatus provides the location information report. At least one of the measurement of the PRS, generation of the location information report, or the transmission of the location information report is based on the indication of the at least one of the measurement instance related information or the expiration time related information.

30 Claims, 14 Drawing Sheets

PERIODIC POSITIONING REPORT ENHANCEMENT

TECHNICAL FIELD

The present disclosure relates generally to communication systems, and more particularly, to a configuration for periodic positioning report enhancement.

INTRODUCTION

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. 5G NR includes services associated with enhanced mobile broadband (eMBB), massive machine type communications (mMTC), and ultra-reliable low latency communications (URLLC). Some aspects of 5G NR may be based on the 4G Long Term Evolution (LTE) standard. There exists a need for further improvements in 5G NR technology. These improvements may also be applicable to other multi-access technologies and the telecommunication standards that employ these technologies.

BRIEF SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In an aspect of the disclosure, a method, a computer-readable medium, and an apparatus are provided. The apparatus may be a device at a UE. The device may be a processor and/or a modem at a UE or the UE itself. The apparatus obtains an indication of at least one of measurement instance related information or expiration time related information associated with a measurement of positioning reference signals (PRS) for the location information report or transmission of the location information report. The apparatus generates the location information report based on the PRS received at the UE. The apparatus provides the location information report. At least one of measurement of the PRS, the generation of the location information report, or the transmission of the location information report is based on the received indication of the at least one of the measurement instance related information or the expiration time related information.

In an aspect of the disclosure, a method, a computer-readable medium, and an apparatus are provided. The apparatus may be a device at a network entity. The device may be a processor and/or a modem at a network entity or the network entity itself. The apparatus transmits, to a UE, a request for a location information report. The request including an indication of at least one of measurement instance related information or expiration time related information associated with a measurement of PRS for the location information report or transmission of the location information report. The apparatus transmits the PRS to the UE. The apparatus receives, from the UE, the location information report. At least one of the location information report or a reception of the location information report is being on the request, which includes including the indication of the at least one of the measurement instance related information or the expiration time related information.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

DETAILED DESCRIPTION

Figure 1:
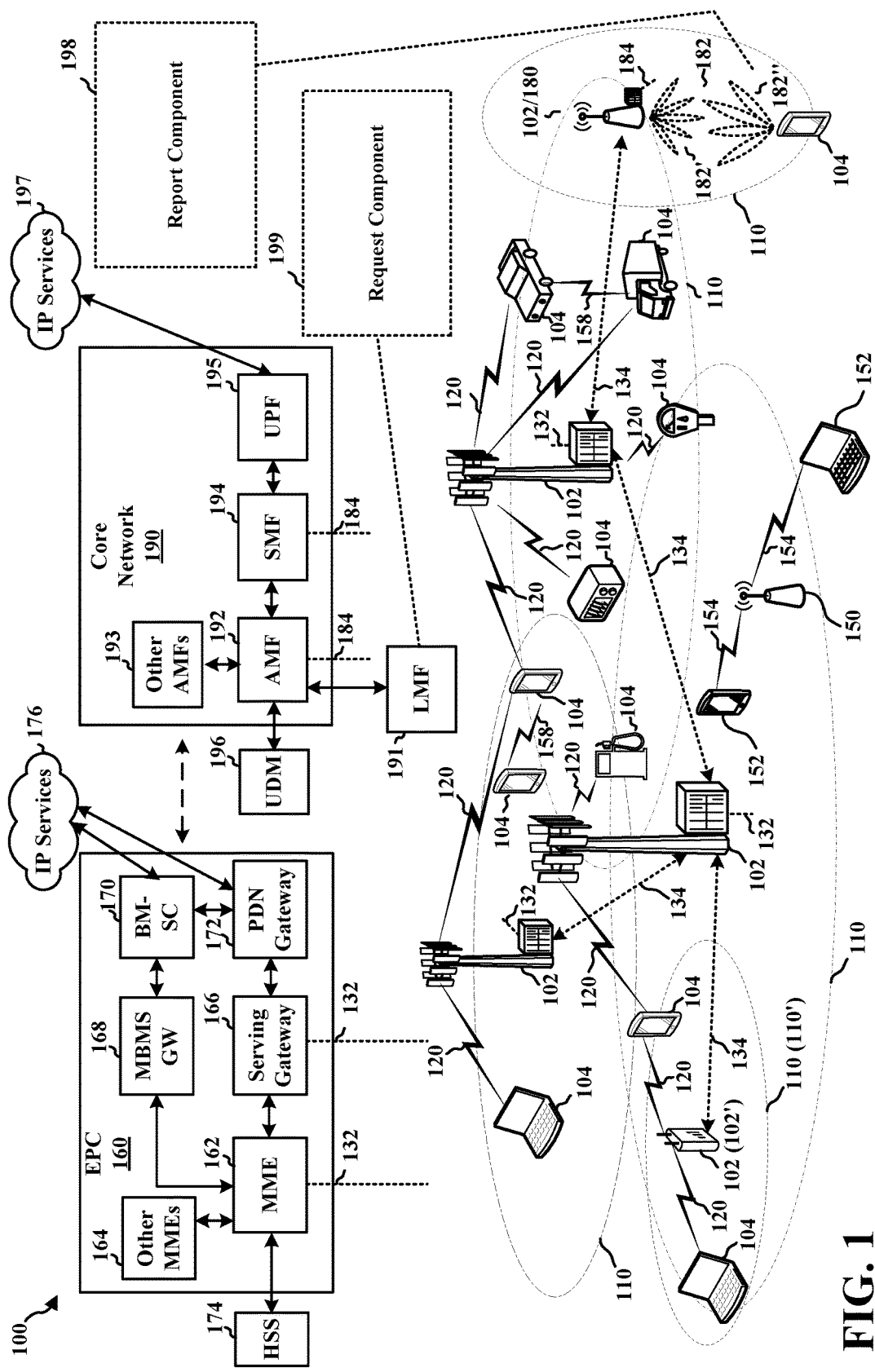
FIG. 1 is a diagram illustrating an example of a wireless communications system and an access network.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example embodiments, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), optical disk storage, magnetic disk storage, other magnetic storage devices, combinations of the types of computer-readable media, or any other medium that can be used to store computer executable code in the form of instructions or data structures that can be accessed by a computer.

While aspects and implementations are described in this application by illustration to some examples, those skilled in the art will understand that additional implementations and use cases may come about in many different arrangements and scenarios. Innovations described herein may be implemented across many differing platform types, devices, systems, shapes, sizes, and packaging arrangements. For example, implementations and/or uses may come about via integrated chip implementations and other non-module-component based devices (e.g., end-user devices, vehicles, communication devices, computing devices, industrial equipment, retail/purchasing devices, medical devices, artificial intelligence (AI)-enabled devices, etc.). While some examples may or may not be specifically directed to use cases or applications, a wide assortment of applicability of described innovations may occur. Implementations may range a spectrum from chip-level or modular components to non-modular, non-chip-level implementations and further to aggregate, distributed, or original equipment manufacturer (OEM) devices or systems incorporating one or more aspects of the described innovations. In some practical settings, devices incorporating described aspects and features may also include additional components and features for implementation and practice of claimed and described aspect. For example, transmission and reception of wireless signals necessarily includes a number of components for analog and digital purposes (e.g., hardware components including antenna, RF-chains, power amplifiers, modulators, buffer, processor(s), interleaver, adders/summers, etc.). It is intended that innovations described herein may be practiced in a wide variety of devices, chip-level components, systems, distributed arrangements, aggregated or disaggregated components, end-user devices, etc. of varying sizes, shapes, and constitution.

FIG. 1 is a diagram illustrating an example of a wireless communications system and an access network 100. The wireless communications system (also referred to as a wireless wide area network (WWAN)) includes base stations 102, UEs 104, an Evolved Packet Core (EPC) 160, and another core network 190 (e.g., a 5G Core (5GC)). The base stations 102 may include macrocells (high power cellular base station) and/or small cells (low power cellular base station). The macrocells include base stations. The small cells include femtocells, picocells, and microcells.

The base stations 102 configured for 4G LTE (collectively referred to as Evolved Universal Mobile Telecommunications System (UMTS) Terrestrial Radio Access Network (E-UTRAN)) may interface with the EPC 160 through first backhaul links 132 (e.g., S1 interface). The base stations 102 configured for 5G NR (collectively referred to as Next Generation RAN (NG-RAN)) may interface with core network 190 through second backhaul links 184. In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (e.g., through the EPC 160 or core network 190) with each other over third backhaul links 134 (e.g., X2 interface). The first backhaul links 132, the second backhaul links 184, and the third backhaul links 134 may be wired or wireless.

The base stations 102 may wirelessly communicate with the UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macrocells may be known as a heterogeneous network. A heterogeneous network may also include Home Evolved Node Bs (eNBs) (HeNBs), which may provide service to a restricted group known as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use multiple-input and multiple-output (MIMO) antenna technology, including spatial multiplexing, beamforming, and/or transmit diversity. The communication links may be through one or more carriers. The base stations 102/UEs 104 may use spectrum up to Y MHz (e.g., 5, 10, 15, 20, 100, 400, etc. MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs 104 may communicate with each other using device-to-device (D2D) communication link 158. The D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, WiMedia, Bluetooth, ZigBee, Wi-Fi based on the Institute of Electrical and Electronics Engineers (IEEE) 802.11 standard, LTE, or NR.

The wireless communications system may further include a Wi-Fi access point (AP) 150 in communication with Wi-Fi stations (STAs) 152 via communication links 154, e.g., in a 5 GHz unlicensed frequency spectrum or the like. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ NR and use the same unlicensed frequency spectrum (e.g., 5 GHz, or the like) as used by the Wi-Fi AP 150. The small cell 102', employing NR in an unlicensed frequency spectrum, may boost coverage to and/or increase capacity of the access network.

The electromagnetic spectrum is often subdivided, based on frequency/wavelength, into various classes, bands, channels, etc. In 5G NR, two initial operating bands have been identified as frequency range designations FR1 (410 MHz-7.125 GHz) and FR2 (24.25 GHz-52.6 GHz). Although a portion of FR1 is greater than 6 GHz, FR1 is often referred to (interchangeably) as a "sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR4a or FR4-1 (52.6 GHz-71 GHz), FR4 (52.6 GHz-114.25 GHz), and FR5 (114.25 GHz-300 GHz). Each of these higher frequency bands falls within the EHF band.

With the above aspects in mind, unless specifically stated otherwise, it should be understood that the term "sub-6 GHz" or the like if used herein may broadly represent frequencies that may be less than 6 GHz, may be within FR1, or may include mid-band frequencies. Further, unless specifically stated otherwise, it should be understood that the term "millimeter wave" or the like if used herein may broadly represent frequencies that may include mid-band frequencies, may be within FR2, FR4, FR4-a or FR4-1, and/or FR5, or may be within the EHF band.

A base station 102, whether a small cell 102' or a large cell (e.g., macro base station), may include and/or be referred to as an eNB, gNodeB (gNB), or another type of base station. Some base stations, such as gNB 180 may operate in a traditional sub 6 GHz spectrum, in millimeter wave frequencies, and/or near millimeter wave frequencies in communication with the UE 104. When the gNB 180 operates in millimeter wave or near millimeter wave frequencies, the gNB 180 may be referred to as a millimeter wave base station. The millimeter wave base station 180 may utilize beamforming 182 with the UE 104 to compensate for the path loss and short range. The base station 180 and the UE 104 may each include a plurality of antennas, such as antenna elements, antenna panels, and/or antenna arrays to facilitate the beamforming.

The base station 180 may transmit a beamformed signal to the UE 104 in one or more transmit directions 182'. The UE 104 may receive the beamformed signal from the base station 180 in one or more receive directions 182". The UE 104 may also transmit a beamformed signal to the base station 180 in one or more transmit directions. The base station 180 may receive the beamformed signal from the UE 104 in one or more receive directions. The base station 180/UE 104 may perform beam training to determine the best receive and transmit directions for each of the base station 180/UE 104. The transmit and receive directions for the base station 180 may or may not be the same. The transmit and receive directions for the UE 104 may or may not be the same.

The EPC 160 may include a Mobility Management Entity (MME) 162, other MMEs 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service, and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The core network 190 may include an Access and Mobility Management Function (AMF) 192, other AMFs 193, a Session Management Function (SMF) 194, and a User Plane Function (UPF) 195. The AMF 192 may be in communication with a Unified Data Management (UDM) 196. The AMF 192 is the control node that processes the signaling between the UEs 104 and the core network 190. Generally, the AMF 192 provides QoS flow and session management. All user Internet protocol (IP) packets are transferred through the UPF 195. The UPF 195 provides UE IP address allocation as well as other functions. The UPF 195 is connected to the IP Services 197. The IP Services 197 may include the Internet, an intranet, an IP Multimedia Subsystem (IMS), a Packet Switch (PS) Streaming (PSS) Service, and/or other IP services. In some instances, the core network 190 may communicate with a location management function (LMF) 191. The LMF may be utilized in positioning architecture. The LMF may receive measurements and assistance information from the NG-RAN and the UE 104 via the AMF 192. The LMF may utilize the measurements and assistance information to compute the position of the UE 104. The LMF may provide a positioning configuration to the UE via the AMF. In such instances, the NG-RAN (e.g., base station 102/180) receives the positioning configuration from the AMF and may then provide the positioning configuration to the UE. In some instances, the NG-RAN (e.g., base station 102/180) may configure the UE with the positioning configuration.

The base station may include and/or be referred to as a gNB, Node B, eNB, an access point, a base transceiver station, a radio base station, a radio transceiver, a transceiver function, a basic service set (BSS), an extended service set (ESS), a transmit reception point (TRP), or some other suitable terminology. The base station 102 provides an access point to the EPC 160 or core network 190 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology. In some scenarios, the term UE may also apply to one or more companion devices such as in a device constellation arrangement. One or more of these devices may collectively access the network and/or individually access the network.

Referring again to FIG. 1, in certain aspects, the UE 104 may be configured to provide a location information report comprising a measurement time, a measurement interval, or latency information related to PRS measurements. For example, the UE 104 may comprise a report component 198 configured to provide a location information report comprising a measurement time, a measurement interval, or latency information related to PRS measurements. The UE 104 may obtain an indication of at least one of measurement instance related information or expiration time related information associated with a measurement of PRS for the location information report or transmission of the location information report. The UE 104 may generate the location information report based on the PRS received at the UE 104. The UE 104 may provide the location information report. At least one of the measurement of the PRS, the generation of the location information report, or the transmission of the location information report is based on the received indication of the at least one of the measurement instance related information or the expiration time related information.

Referring again to FIG. 1, in certain aspects, the network entity may be configured to request a UE 104 to provide a location information report comprising a measurement time, a measurement interval, or latency information related to PRS measurements. For example, the network entity may comprise a request component 199 configured to request the UE 104 to provide a location information report comprising a measurement time, a measurement interval, or latency information related to PRS measurements. The network entity may transmit, to a UE 104, a request for a location information report. The request including an indication of at least one of measurement instance related information or expiration time related information associated with a measurement of PRS for the location information report or transmission of the location information report. The network entity may transmit the PRS to the UE 104. The network entity may receive, from the UE 104, the location information report. At least one of the location information report or a reception of the location information report being based on the request including the indication of the at least one of the measurement instance related information or the expiration time related information.

Although the following description may be focused on 5G NR, the concepts described herein may be applicable to other similar areas, such as LTE, LTE-A, CDMA, GSM, and other wireless technologies.

Figure 2:
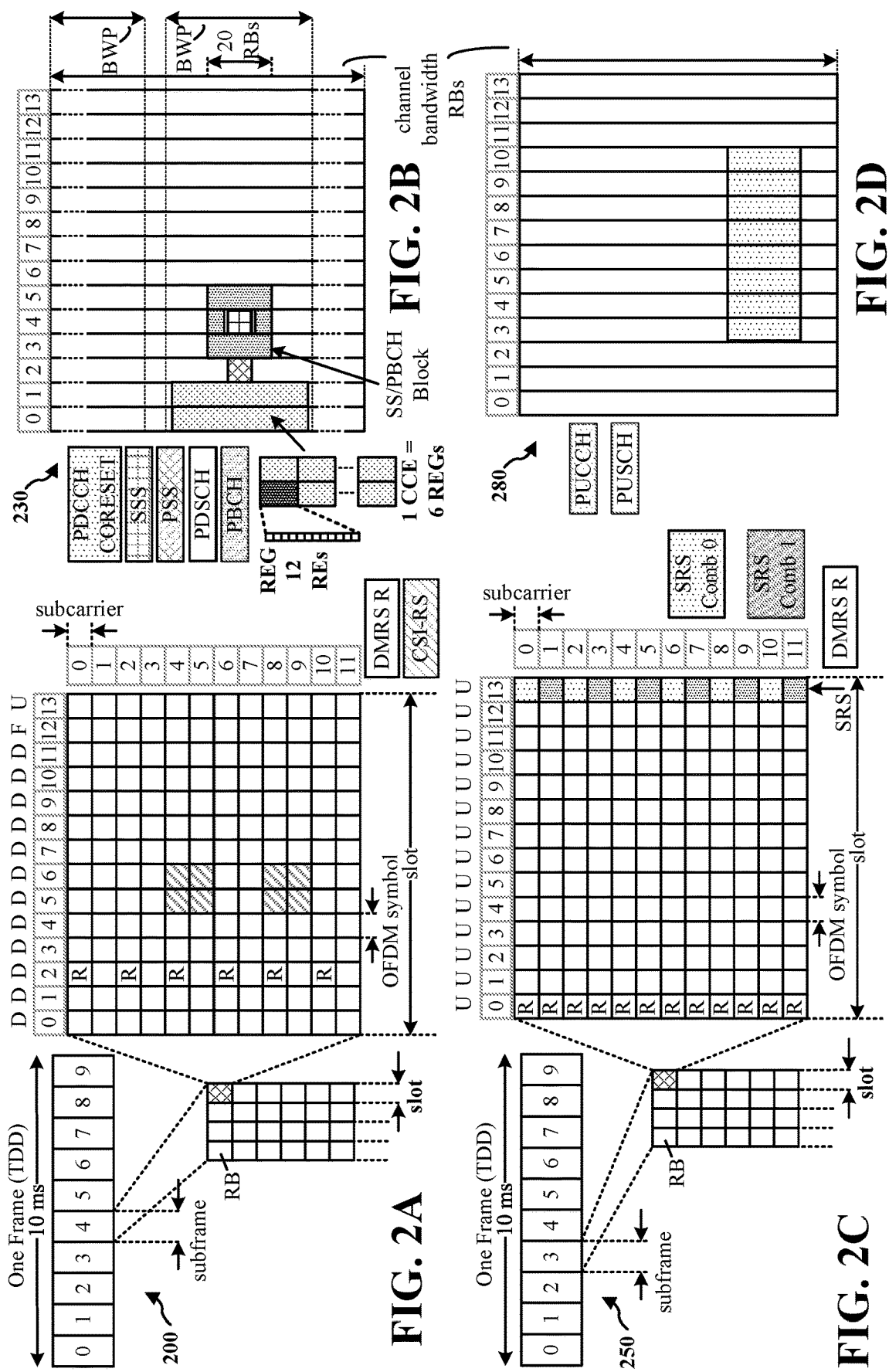
FIG. 2A is a diagram illustrating an example of a first frame, in accordance with various aspects of the present disclosure.
FIG. 2B is a diagram illustrating an example of DL channels within a subframe, in accordance with various aspects of the present disclosure.
FIG. 2C is a diagram illustrating an example of a second frame, in accordance with various aspects of the present disclosure.
FIG. 2D is a diagram illustrating an example of UL channels within a subframe, in accordance with various aspects of the present disclosure.

FIG. 2A is a diagram 200 illustrating an example of a first subframe within a 5G NR frame structure. FIG. 2B is a diagram 230 illustrating an example of DL channels within a 5G NR subframe. FIG. 2C is a diagram 250 illustrating an example of a second subframe within a 5G NR frame structure. FIG. 2D is a diagram 280 illustrating an example of UL channels within a 5G NR subframe. The 5G NR frame structure may be frequency division duplexed (FDD) in which for a particular set of subcarriers (carrier system bandwidth), subframes within the set of subcarriers are dedicated for either DL or UL, or may be time division duplexed (TDD) in which for a particular set of subcarriers (carrier system bandwidth), subframes within the set of subcarriers are dedicated for both DL and UL. In the examples provided by FIGS. 2A, 2C, the 5G NR frame structure is assumed to be TDD, with subframe 4 being configured with slot format 28 (with mostly DL), where D is DL, U is UL, and F is flexible for use between DL/UL, and subframe 3 being configured with slot format 1 (with all UL). While subframes 3, 4 are shown with slot formats 1, 28, respectively, any particular subframe may be configured with any of the various available slot formats 0-61. Slot formats 0, 1 are all DL, UL, respectively. Other slot formats 2-61 include a mix of DL, UL, and flexible symbols. UEs are configured with the slot format (dynamically through DL control information (DCI), or semi-statically/statically through radio resource control (RRC) signaling) through a received slot format indicator (SFI). Note that the description infra applies also to a 5G NR frame structure that is TDD.

FIGS. 2A-2D illustrate a frame structure, and the aspects of the present disclosure may be applicable to other wireless communication technologies, which may have a different frame structure and/or different channels. A frame (10 ms) may be divided into 10 equally sized subframes (1 ms). Each subframe may include one or more time slots. Subframes may also include mini-slots, which may include 7, 4, or 2 symbols. Each slot may include 14 or 12 symbols, depending on whether the cyclic prefix (CP) is normal or extended. For normal CP, each slot may include 14 symbols, and for extended CP, each slot may include 12 symbols. The symbols on DL may be CP orthogonal frequency division multiplexing (OFDM) (CP-OFDM) symbols. The symbols on UL may be CP-OFDM symbols (for high throughput scenarios) or discrete Fourier transform (DFT) spread OFDM (DFT-s-OFDM) symbols (also referred to as single carrier frequency-division multiple access (SC-FDMA) symbols) (for power limited scenarios; limited to a single stream transmission). The number of slots within a subframe is based on the CP and the numerology. The numerology defines the subcarrier spacing (SCS) and, effectively, the symbol length/duration, which is equal to 1/SCS.

| $\mu$ | SCS $\Delta f = 2^\mu \cdot 15[kHz]$ | Cyclic prefix |
|---|---|---|
| 0 | 15 | Normal |
| 1 | 30 | Normal |
| 2 | 60 | Normal, Extended |
| 3 | 120 | Normal |
| 4 | 240 | Normal |

For normal CP (14 symbols/slot), different numerologies $\mu 0$ to 4 allow for 1, 2, 4, 8, and 16 slots, respectively, per subframe. For extended CP, the numerology 2 allows for 4 slots per subframe. Accordingly, for normal CP and numerology $\mu$, there are 14 symbols/slot and $2^\mu$ slots/subframe. The subcarrier spacing may be equal to $2^\mu*15$ kHz, where $\mu$ is the numerology 0 to 4. As such, the numerology $\mu=0$ has a subcarrier spacing of 15 kHz and the numerology $\mu=4$ has a subcarrier spacing of 240 kHz. The symbol length/duration is inversely related to the subcarrier spacing. FIGS. 2A-2D provide an example of normal CP with 14 symbols per slot and numerology $\mu=2$ with 4 slots per subframe. The slot duration is 0.25 ms, the subcarrier spacing is 60 kHz, and the symbol duration is approximately 16.67 $\mu$s. Within a set of frames, there may be one or more different bandwidth parts (BWPs) (see FIG. 2B) that are frequency division multiplexed. Each BWP may have a particular numerology and CP (normal or extended).

A resource grid may be used to represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme.

As illustrated in FIG. 2A, some of the REs carry reference (pilot) signals (RS) for the UE. The RS may include demodulation RS (DM-RS) (indicated as R for one particular configuration, but other DM-RS configurations are possible) and channel state information reference signals (CSI-RS) for channel estimation at the UE. The RS may also include beam measurement RS (BRS), beam refinement RS (BRRS), and phase tracking RS (PT-RS).

FIG. 2B illustrates an example of various DL channels within a subframe of a frame. The physical downlink control channel (PDCCH) carries DCI within one or more control channel elements (CCEs) (e.g., 1, 2, 4, 8, or 16 CCEs), each CCE including six RE groups (REGs), each REG including 12 consecutive REs in an OFDM symbol of an RB. A PDCCH within one BWP may be referred to as a control resource set (CORESET). A UE is configured to monitor PDCCH candidates in a PDCCH search space (e.g., common search space, UE-specific search space) during PDCCH monitoring occasions on the CORESET, where the PDCCH candidates have different DCI formats and different aggregation levels. Additional BWPs may be located at greater and/or lower frequencies across the channel bandwidth. A primary synchronization signal (PSS) may be within symbol 2 of particular subframes of a frame. The PSS is used by a UE 104 to determine subframe/symbol timing and a physical layer identity. A secondary synchronization signal (SSS) may be within symbol 4 of particular subframes of a frame. The SSS is used by a UE to determine a physical layer cell identity group number and radio frame timing. Based on the physical layer identity and the physical layer cell identity group number, the UE can determine a physical cell identifier (PCI). Based on the PCI, the UE can determine the locations of the DM-RS. The physical broadcast channel (PBCH), which carries a master information block (MIB), may be logically grouped with the PSS and SSS to form a synchronization signal (SS)/PBCH block (also referred to as SS block (SSB)). The MIB provides a number of RBs in the system bandwidth and a system frame number (SFN). The physical downlink shared channel (PDSCH) carries user data, broadcast system information not transmitted through the PBCH such as system information blocks (SIBs), and paging messages.

As illustrated in FIG. 2C, some of the REs carry DM-RS (indicated as R for one particular configuration, but other DM-RS configurations are possible) for channel estimation at the base station. The UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. The UE may transmit sounding reference signals (SRS). The SRS may be transmitted in the last symbol of a subframe. The SRS may have a comb structure, and a UE may transmit SRS on one of the combs. The SRS may be used by a base station for channel quality estimation to enable frequency-dependent scheduling on the UL.

FIG. 2D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and hybrid automatic repeat request (HARQ) acknowledgment (ACK) (HARQ-ACK) feedback (i.e., one or more HARQ ACK bits indicating one or more ACK and/or negative ACK (NACK)). The PUSCH carries data, and may additionally be used to carry a buffer status report (BSR), a power headroom report (PHR), and/or UCI.

Figure 3:
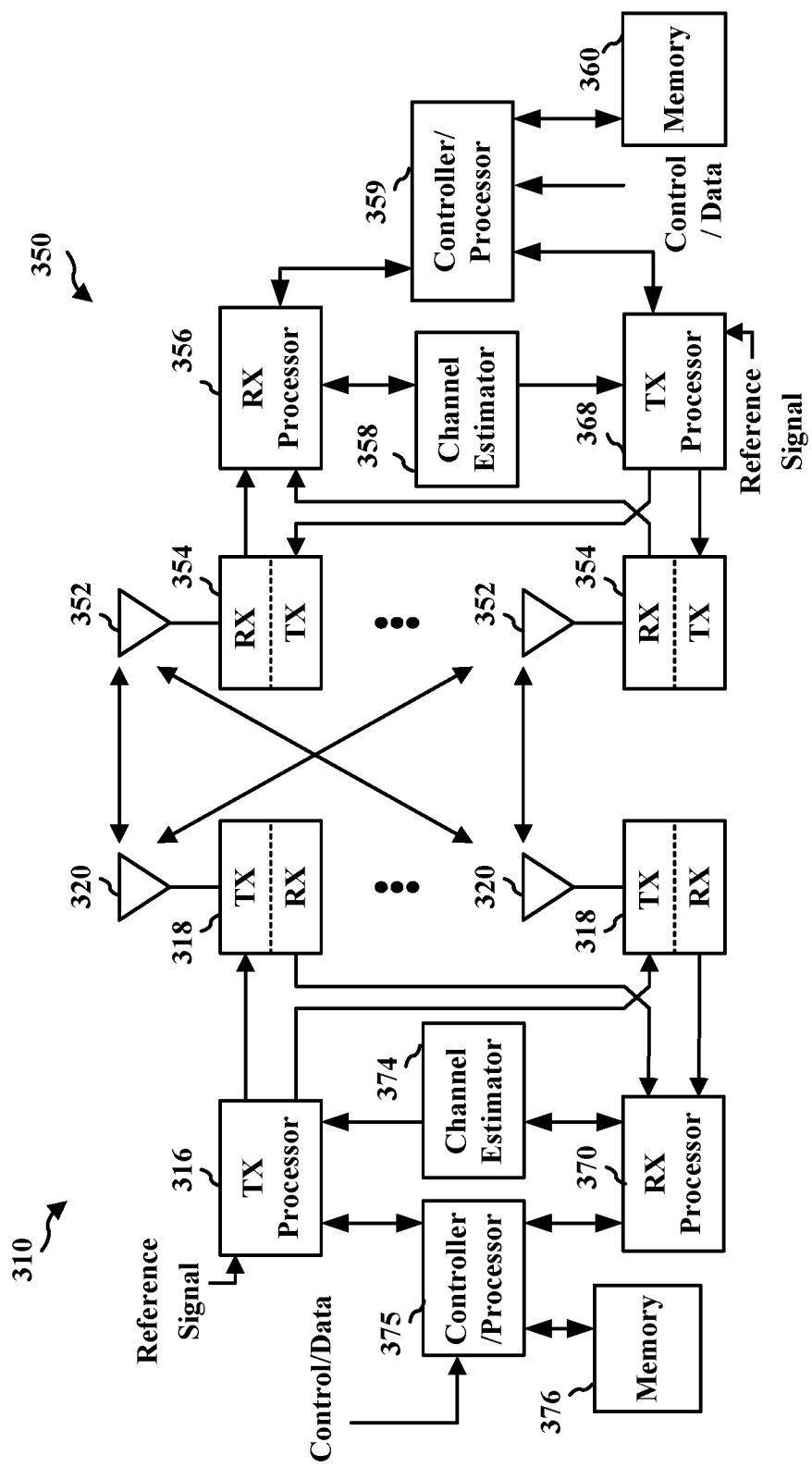
FIG. 3 is a diagram illustrating an example of a base station and UE in an access network.

FIG. 3 is a block diagram of a base station 310 in communication with a UE 350 in an access network. In the DL, IP packets from the EPC 160 may be provided to a controller/processor 375. The controller/processor 375 implements layer 3 and layer 2 functionality. Layer 3 includes a radio resource control (RRC) layer, and layer 2 includes a service data adaptation protocol (SDAP) layer, a packet data convergence protocol (PDCP) layer, a radio link control (RLC) layer, and a medium access control (MAC) layer. The controller/processor 375 provides RRC layer functionality associated with broadcasting of system information (e.g., MIB, SIBs), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the UE 350. Each spatial stream may then be provided to a different antenna 320 via a separate transmitter 318 TX. Each transmitter 318 TX may modulate a radio frequency (RF) carrier with a respective spatial stream for transmission.

At the UE 350, each receiver 354 RX receives a signal through its respective antenna 352. Each receiver 354 RX recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the UE 350. If multiple spatial streams are destined for the UE 350, they may be combined by the RX processor 356 into a single OFDM symbol stream. The RX processor 356 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the base station 310. These soft decisions may be based on channel estimates computed by the channel estimator 358. The soft decisions are then decoded and deinterleaved to recover the data and control signals that were originally transmitted by the base station 310 on the physical channel. The data and control signals are then provided to the controller/processor 359, which implements layer 3 and layer 2 functionality.

The controller/processor 359 can be associated with a memory 360 that stores program codes and data. The memory 360 may be referred to as a computer-readable medium. In the UL, the controller/processor 359 provides demultiplexing between transport and logical channels, packet reassembly, deciphering, header decompression, and control signal processing to recover IP packets from the EPC 160. The controller/processor 359 is also responsible for error detection using an ACK and/or NACK protocol to support HARQ operations.

Similar to the functionality described in connection with the DL transmission by the base station 310, the controller/processor 359 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by the base station 310 may be used by the TX processor 368 to select the appropriate coding and modulation schemes, and to facilitate spatial processing. The spatial streams generated by the TX processor 368 may be provided to different antenna 352 via separate transmitters 354TX. Each transmitter 354TX may modulate an RF carrier with a respective spatial stream for transmission.

The UL transmission is processed at the base station 310 in a manner similar to that described in connection with the receiver function at the UE 350. Each receiver 318RX receives a signal through its respective antenna 320. Each receiver 318RX recovers information modulated onto an RF carrier and provides the information to a RX processor 370.

The controller/processor 375 can be associated with a memory 376 that stores program codes and data. The memory 376 may be referred to as a computer-readable medium. In the UL, the controller/processor 375 provides demultiplexing between transport and logical channels, packet reassembly, deciphering, header decompression, control signal processing to recover IP packets from the UE 350. IP packets from the controller/processor 375 may be provided to the EPC 160. The controller/processor 375 is also responsible for error detection using an ACK and/or NACK protocol to support HARQ operations.

At least one of the TX processor 368, the RX processor 356, and the controller/processor 359 may be configured to perform aspects in connection with 198 of FIG. 1.

At least one of the TX processor 316, the RX processor 370, and the controller/processor 375 may be configured to perform aspects in connection with 199 of FIG. 1.

In wireless communications, a request for location information (e.g., requestLocationInformation) may provide a reporting interval (e.g., reportingInterval). The reporting interval may indicate two behaviors, first, a report should be done no later than the interval after the reception of a request, and second, the subsequent reports should follow the interval requirements. The reporting interval (e.g., reportingInterval) may indicate the interval between location information reports and the response time requirement for the first location information report. Enumerated values ri0-25, ri0-5, ri1, ri2, ri4, ri8, ri16, ri32, ri64 may correspond to reporting intervals of 1, 2, 4, 8, 10, 16, 20, 32, and 64 seconds, respectively. Measurement reports containing no measurements or no location estimate are required when a reportingInterval expires before a target device is able to obtain new measurements or obtain a new location estimate. A reporting amount (e.g., reportingAmount) may indicate the number of periodic location information reports requested. Enumerated values may correspond to 1, 2, 4, 8, 16, 32, 64, or infinite/indefinite number of reports. If the reportingAmount is 'infinite/indefinite', the target device should continue periodic reporting until an abort message is received.

Figure 4:
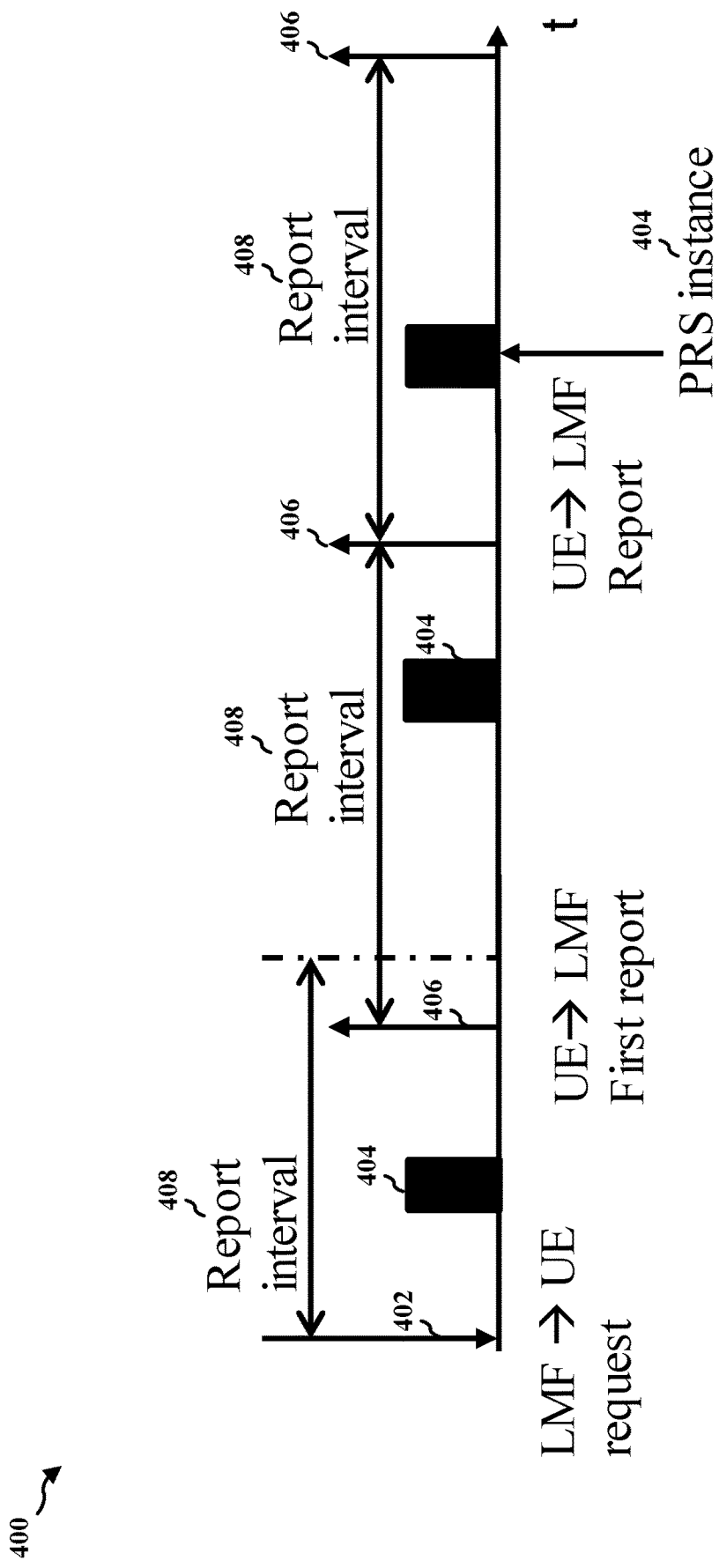
FIG. 4 is a diagram illustrating an example of PRS periodic reports.

For example, with reference to diagram 400 of FIG. 4, the LMF may send a request 402 to the UE, via the base station, requesting location information. The UE should submit the first location information within the report interval 408. The UE may monitor a PRS instance 404 and determine the requested location information and provide a report 406 to the LMF by LTE positioning protocol (LPP), via the base station, comprising the requested location information. The UE may continue to submit reports 406 during the report interval 408 for subsequent PRS instances 404, where the report interval 408 may be a requested interval or a fixed interval. This may apply for both measurement reports in UE-assisted positioning or location estimate reports in UE-based positioning. Both instances may share the same request message in LPP.

However, in some instances, a measurement interval may fluctuate, or a latency for providing the report may fluctuate (e.g., from the measured PRS instance to the reception time at a location server (LCS) client. In some instances, such as in a closed loop controller in the cloud or server, where the location of a target UE is an input to the controller, such fluctuations may negatively impact performance. In some instances, such as in latency sensitive industrial internet of things (IIOT), such device may heavily rely on latency such that the fluctuations may negatively impact performance.

Figure 5:
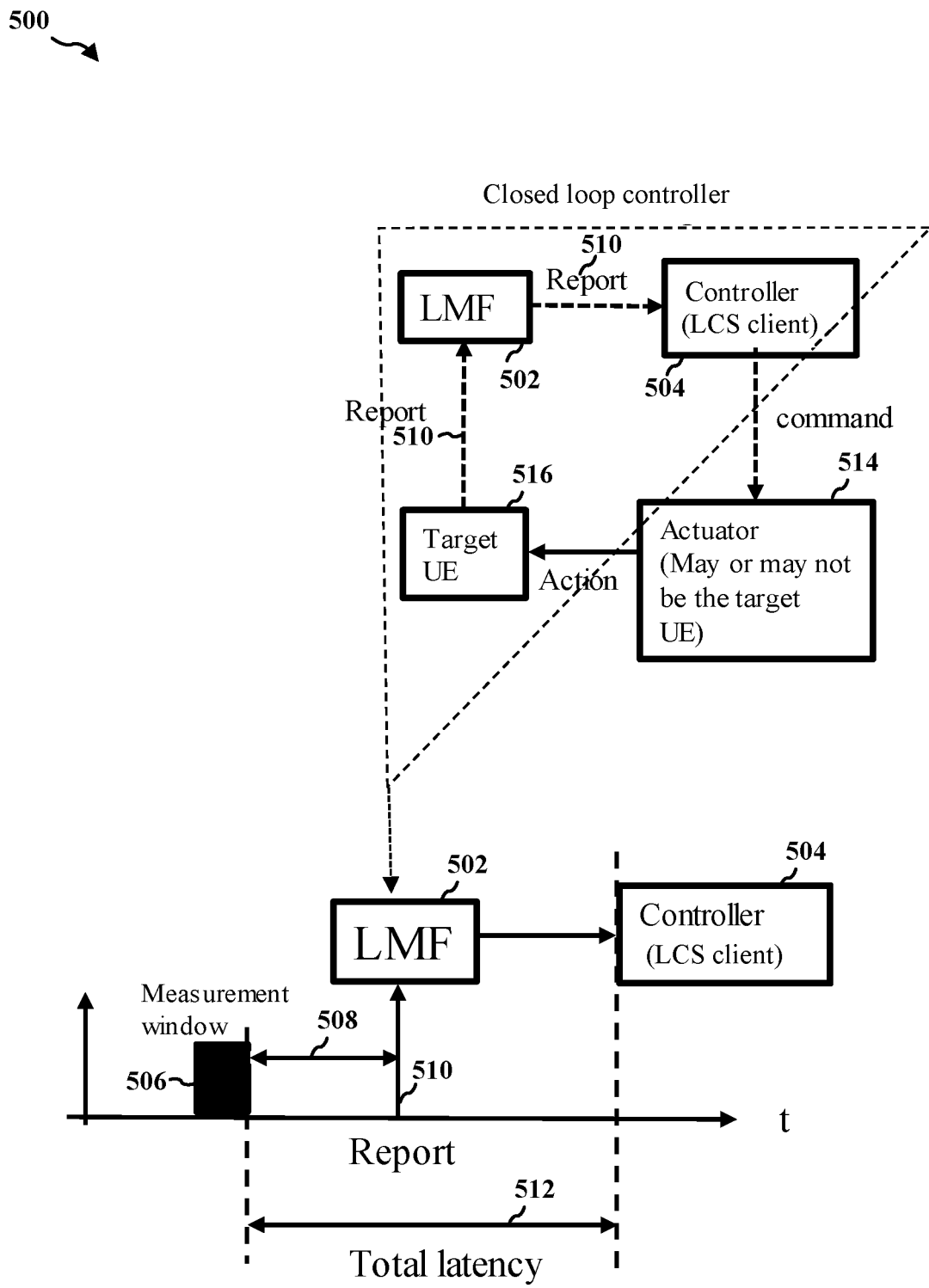
FIG. 5 is a diagram illustrating an example of a closed loop system.

FIG. 5 is a diagram 500 of a closed loop controller where positioning is an input. The closed loop system may include an LMF 502, the controller LCS client 504, an actuator 514, and a target UE 516. The target UE 516 may transmit the report 510 to the LMF in response to a request for the report. For example, the target UE 516 may perform a measurement within a measurement window 506, and may transmit the report 510 after a period of time 508 after the measurement of the PRS instance within the measurement window 506. The LMF 502 may provide the location of the target UE 516 based on the report 510. A total latency 512 may comprise the time after the measurement is performed within the measurement window 506 by the target UE 516 to the time that the LCS client 504 receives the location of the target UE 516 from the LMF 502. The LCS client 504 may send a command to the actuator 514. The actuator may or may not comprise the target UE. The actuator 514 may cause the target UE 514 to perform an action in response to receipt of the command from the LCS client 504. Minimizing the latency (e.g., 508) between the measurement window 506 and transmission of the report 510 is desirable. In some instances, actions or applications within the closed loop controller may comprise a fixed interval between consecutive measurement windows, or may be configured to reduce latency by fast reporting. The fast reporting may allow remaining latency budget for processing or feedback steps in the loop. However, the periodic positioning report may not support closed loop controller systems.

Aspects presented herein provide a configuration for an enhanced periodic positioning report. For example, an LCS client may send a location request to an LMF comprising additional measurement requirements. In some aspects, the additional measurement requirements may comprise an absolute or relative measurement time and/or interval, or may comprise a latency requirement. For example, the LMF may send a measurement window related indication to the target UE in a request for location information (e.g., requestLocationInformation) based on the LCS client requirement. At least one advantage of the disclosure is that an apparatus configured with the enhanced periodic positioning report may be integrated into a master controller in a closed loop system. For example, the apparatus may be integrated into a master controller for an IIOT factory floor which may specify latency requirements for the master controller to coordinate multiple machines. At least another advantage of the disclosure is that the enhanced periodic positioning report may improve accuracy based at least on the utilization of measurement instances. Yet another advantage of the disclosure is that expired location information may not be transmitted which may improve spectral efficiency or latency.

Figure 6:
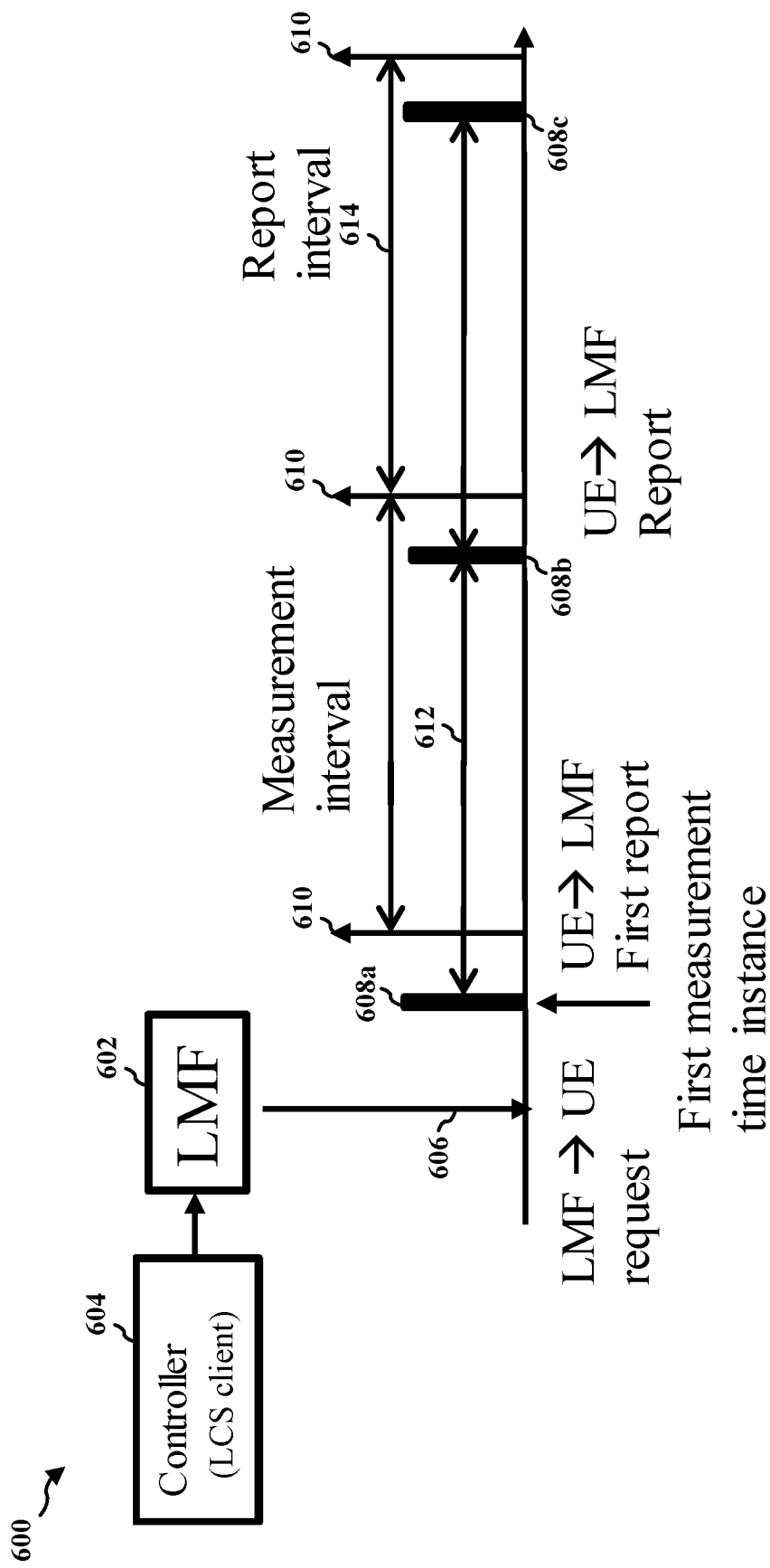
FIG. 6 is a diagram illustrating an example of an additional measurement requirement.

FIG. 6 is a diagram 600 of an additional measurement requirement from a controller (e.g., LCS client). In the diagram 600, the LCS client 604 may send a request with additional information to the LMF 602. The LMF 602 may send a request 606 to the UE, via a base station, requesting the additional measurement information. The request for additional measurement information may be comprised within a request for a location information report. In some aspects, the additional measurement information may comprise an absolute or relative measurement time and/or interval. For example, the additional measurement information may comprise a first absolute measurement time instance for measuring a first received PRS 608a and a measurement interval 612 for measuring subsequently received PRS (e.g., 608b, 608c). In some aspects, the additional measurement information may comprise the measurement interval 612 for measuring PRS (e.g., 608a, 608b, 608c). The additional measurement information may further comprise a time range for a first absolute measurement time instance for measuring the first PRS 608a. In some aspects, the additional measurement information may comprise a list of absolute measurement time instances or a list of intervals. Instances may have the same or different intervals. For example, the additional measurement information may comprise at least one of a plurality of absolute measurement time instances for measuring the PRS or a plurality of measurement intervals 612 for measuring the PRS. In some aspects, the additional measurement information may comprise a report interval 614 for reporting the additional measurement information. In some aspects, the additional measurement information may comprise an allowed time uncertainty for one or more measurement instance for measuring the PRS.

Figure 7:
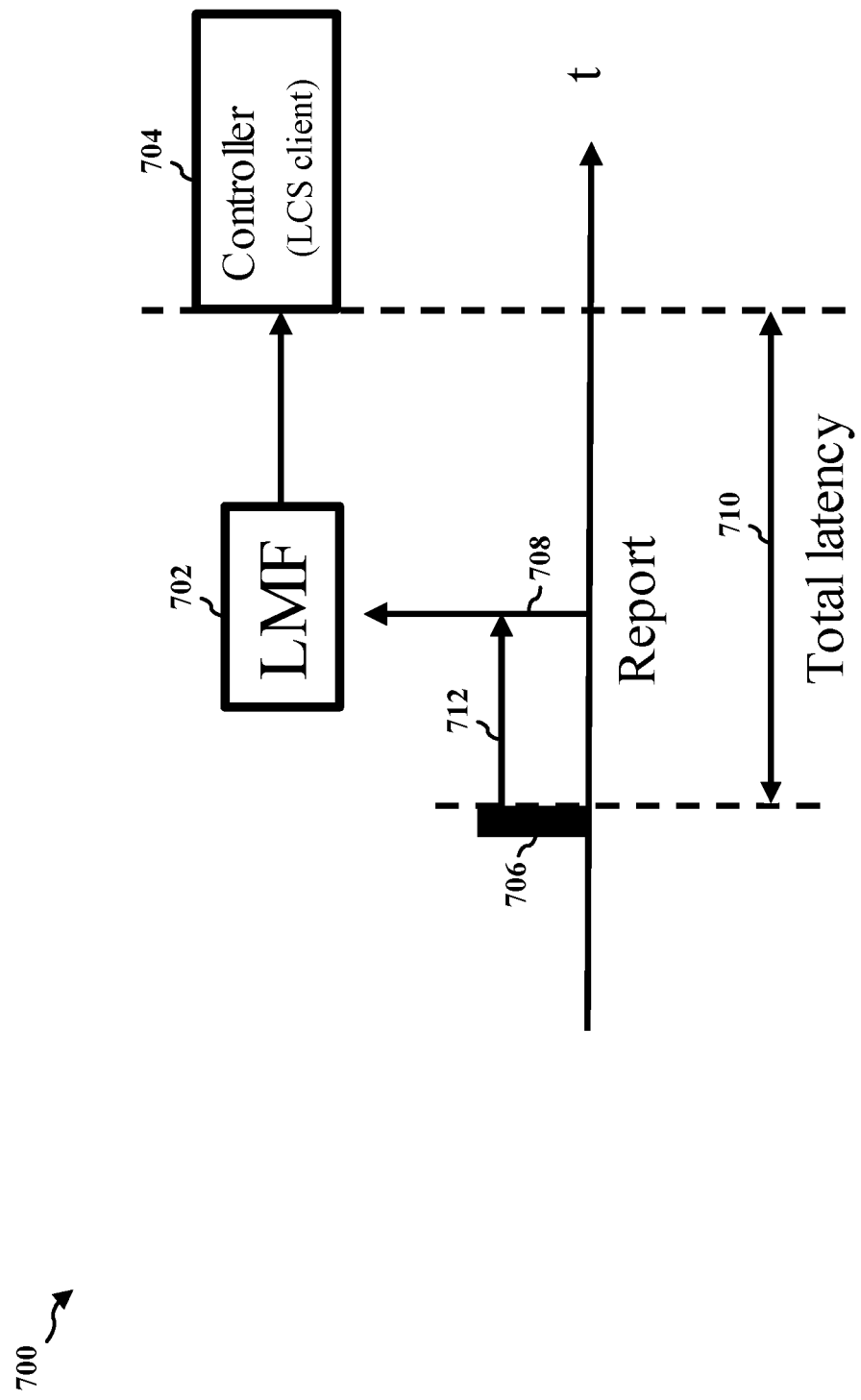
FIG. 7 is a diagram illustrating an example of an additional measurement requirement.

FIG. 7 is a diagram 700 of an additional measurement requirement from a controller (e.g., LCS client). The additional measurement requirement may comprise information related to an expiration time for measurement reports 708. In some aspects, the LCS client 704 may define a latency budget for measurement reports 708. For example, the latency budget may comprise a total latency 710 from a measured PRS instance 706 to the reception time at LCS client 704. In some aspects, the latency budget may comprise a latency 712 from the measured PRS instance 706 to the time the measurement report 708 is reported to the LMF 702 from the UE.

Figure 8:
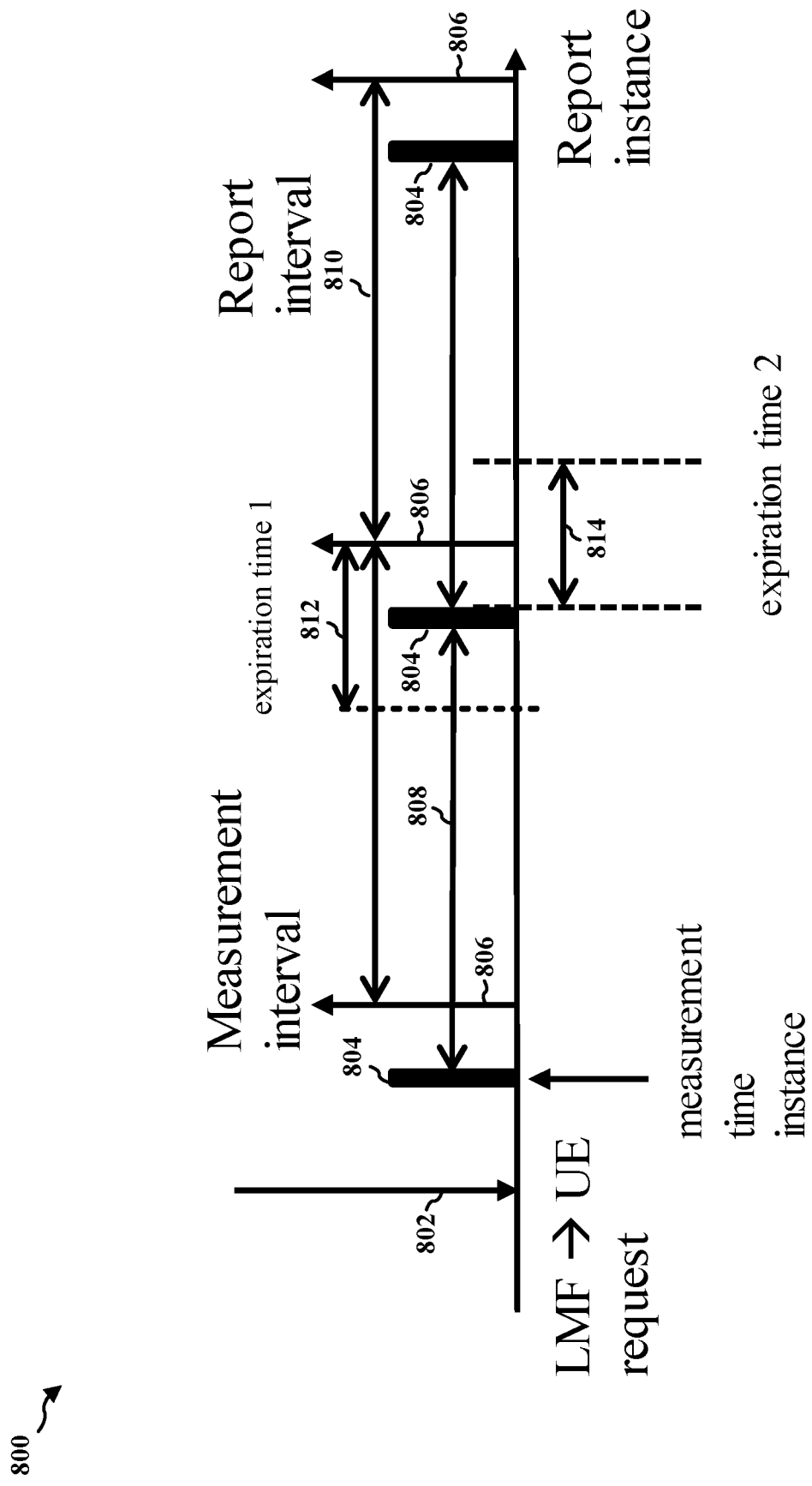
FIG. 8 is a diagram illustrating an example of a PRS measurement request enhancement.

FIG. 8 is a diagram 800 of a PRS measurement request enhancement. The LMF may provide a measurement request to the UE, where the measurement request comprises at least one of an LCS client requirements for the UE or a conversion of requirements for other request parameters. For example, the LMF may provide measurement instance related information comprising at least one of an absolute time of PRS measurement instances (e.g., 804), a measurement interval 808 between PRS measurement instances 804, a time uncertainty allowance for each measurement instances 804, or a response time requirement of the first measurement instance 804. In some aspects, the LMF may provide report instance related information. For example, the report instance related information may comprise at least one of an absolute time of reporting instances 806 for transmitting the location information report, a reporting interval 810 for transmitting the location information report, a time uncertainty allowance associated with transmitting the location information report at the reporting instances 806, or a response time requirement for a first reporting instance 806 for transmitting a first location information report. In some aspects, the LMF may provide expiration time related information. For example, the expiration time related information comprises at least one of an expiration time indicating a first expiration time 812 after which the PRS should be measured at the PRS measurement instance 804 for generating the location information report, or a second expiration time 814 after the PRS is measured before which the location information report should be transmitted. The expiration time may be based on measurement information or report information. For example, if measurement information is provided, then the report should be reported no later than measurement instance 804+expiration time 2 814. In another example, if report information is provided, then the PRS measurement instance should be measured no earlier than report instance 806—expiration time 1 812. The location information report may be generated based on m samples of PRS resource instances, where each sample of the m samples may be based on one PRS occasion within a PRS measurement window.

Figure 9A:
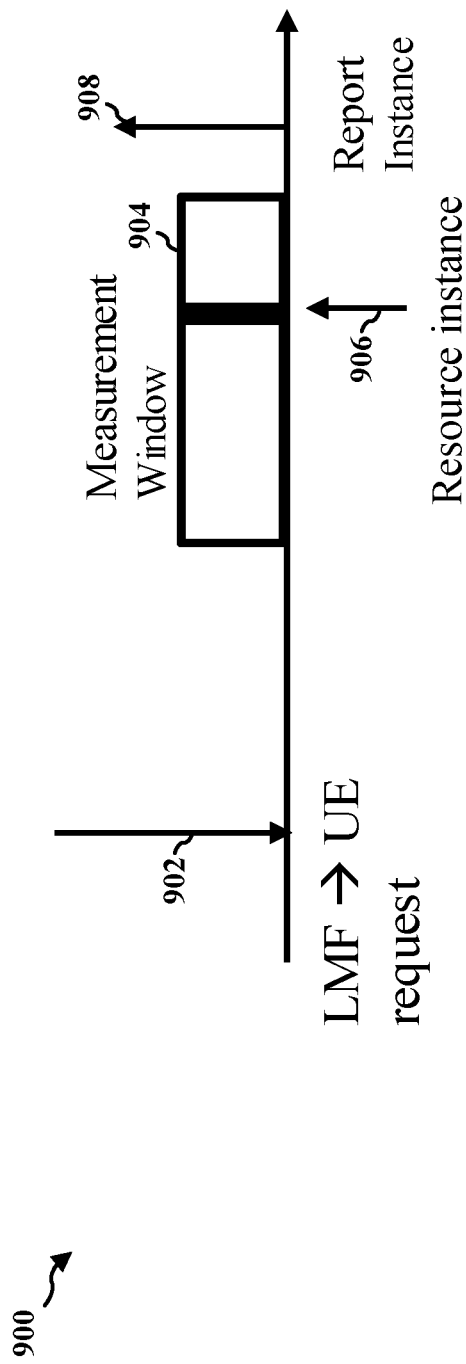
FIGS. 9A and 9B are diagrams illustrating examples of measurement time instances.
Figure 9B:
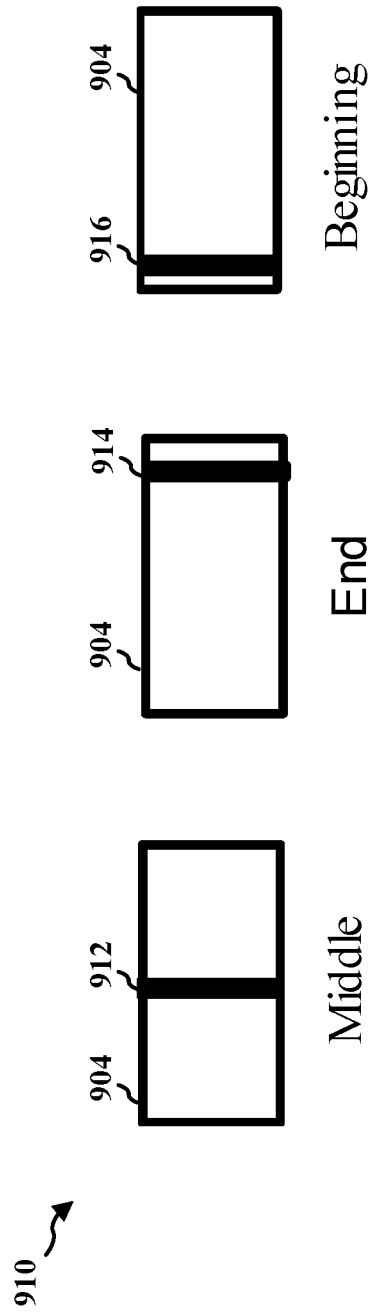

FIGS. 9A and 9B are diagrams 900, 910 of measurement time instances. In diagram 900 of FIG. 9A, the UE may derive the resource instance 906 based on the request 902 from the LMF. In some aspects, the LMF may transmit the request 902 to the UE to request the UE to report the measurement with either m samples or 4 samples. For example, the location information report may be generated based on m samples of PRS resource instances within a PRS measurement window 904, each sample of the m samples may be based on one PRS resource instance 906 within the PRS measurement window 904. Each sample may be measured within one PRS resource instance 906, such that one report may be based on the reference signals within a measurement window 904. With reference to diagram 910 of FIG. 9B, the UE may be configured to select a measurement window 904 around the PRS resource instance 906. For example, the UE may select a measurement window 904 such that the PRS resource instance 906 is at the middle 912 of the measurement window 904, at an end 914 of the measurement window 904, or at a beginning 916 of the measurement window 904. The UE may measure m samples within the measurement window 904, and report the measurements.

Figure 10:
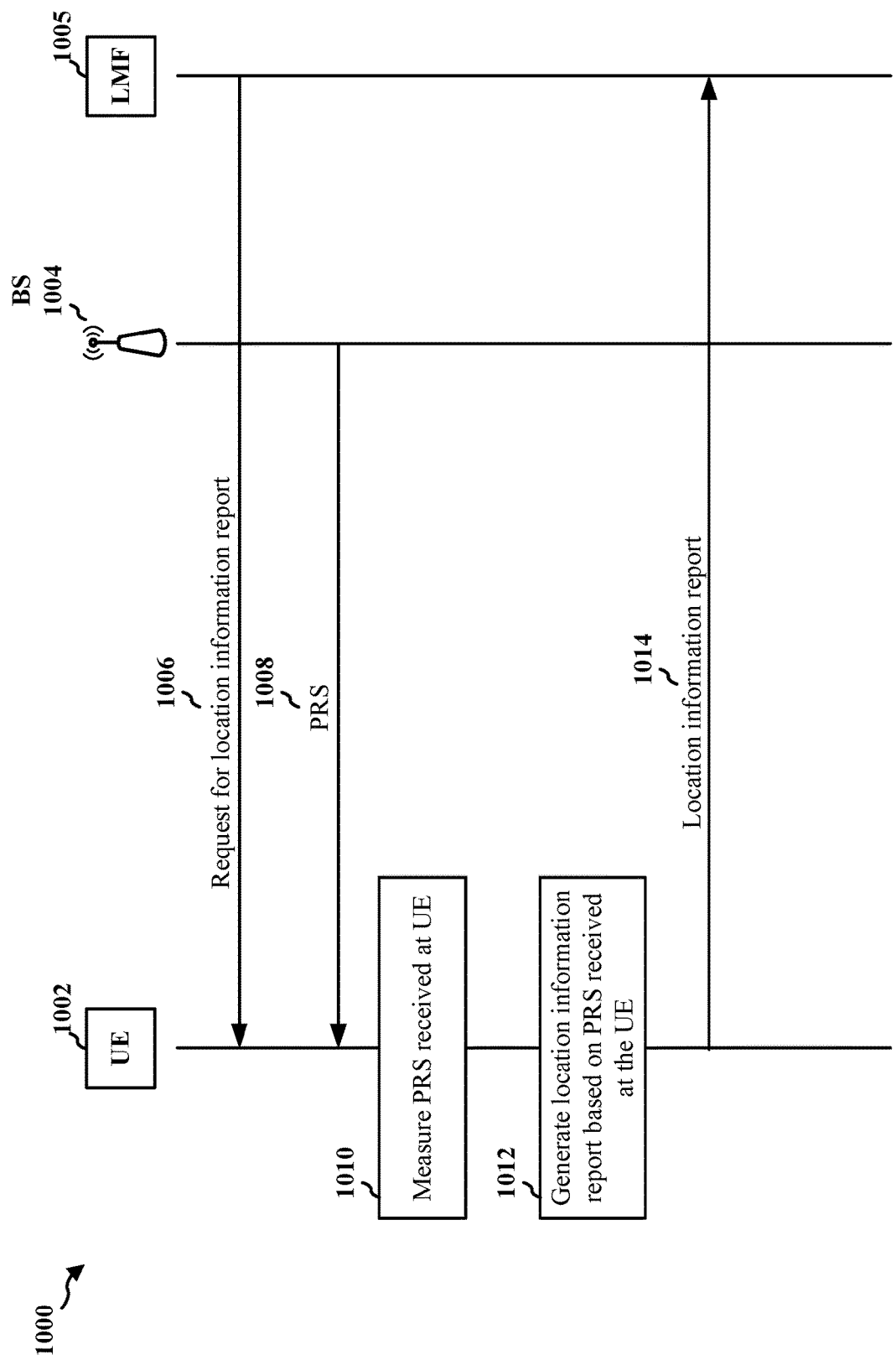
FIG. 10 is a call flow diagram of signaling between a UE, a base station, and a location management function (LMF).

FIG. 10 is a call flow diagram 1000 of signaling between a UE 1002, a base station 1004, and a network entity (e.g., LMF 1005). The base station 1004 may be configured to provide at least one cell. The UE 1002 may be configured to communicate with the base station 1004. The LMF 1005 and UE 1002 may communicate with each other via the base station 1004. For example, in the context of FIG. 1, the base station 1004 may correspond to base station 102/180 and, accordingly, the cell may include a geographic coverage area 110 in which communication coverage is provided and/or small cell 102' having a coverage area 110'. Further, a UE 1002 may correspond to at least UE 104. Further, the network entity may be within the core network 190 or may correspond to the LMF 191. In another example, in the context of FIG. 3, the base station 1004 may correspond to base station 310 and the UE 1002 may correspond to UE 350.

At 1006, the network entity (e.g., LMF 1005) may transmit a request for a location information report. The LMF 1005 may transmit the request for the location information report to the UE 1002. The UE 1002 may obtain the request for the location information report from the LMF 1005. The request may include an indication of at least one of measurement instance related information or expiration time related information associated with a measurement of PRS for the location information report or transmission of the location information report. In some aspects, the LMF 1005 may transmit the request in response to a reception of requirements from a client (not shown). For example, the client (e.g., master controller) may transmit to the LMF 1005 requirements, such that the LMF 1005 translates the requirements into at least one of latency requirements, accuracy requirements, or measurement selections. In some aspects, the indication of the at least one of the measurement instance related information or the expiration time related information may indicate the measurement instance related information. The measurement instance related information may comprise a first absolute measurement time instance for measuring a first received PRS and a measurement interval for measuring subsequently received PRS. In some aspects, the indication of the at least one of the measurement instance related information or the expiration time related information may indicate the measurement instance related information. The measurement instance related information may comprise a measurement interval for measuring the PRS. The measurement instance related information may further comprise a time range for a first absolute measurement time instance for measuring a first received PRS. In some aspects, the indication of the at least one of the measurement instance related information or the expiration time related information may indicate the measurement instance related information. The measurement instance related information may comprise at least one of a plurality of absolute measurement time instances for measuring the PRS or a plurality of measurement intervals for measuring the PRS. In some aspects, the indication of the at least one of the measurement instance related information or the expiration time related information may indicate the measurement instance related information. The measurement instance related information may comprise an allowed time uncertainty associated with one or more measurement instances for measuring the PRS. In some aspects, the indication of the at least one of the measurement instance related information or the expiration time related information may indicate the expiration time related information. The expiration time related information may comprise a latency requirement between a first time at which the PRS is measured and a second time subsequent to the first time. In some aspects, the second time may comprise one of a time at which the location information report is transmitted, the time at which the location information report reaches a location server client, or the time in which the location information report is received at the base station. In some aspects, the indication of the at least one of the measurement instance related information or the expiration time related information may indicate the measurement instance related information. The measurement instance related information may comprise at least one of an absolute time of measurement instances for measuring the PRS, a measurement interval for measuring the PRS, a time uncertainty allowance associated with measuring the PRS at the measurement instances, or a response time requirement for a first measurement instance for measuring the PRS. In some aspects, the indication may further include report instance related information. The report instance related information may comprise at least one of an absolute time of reporting instances for transmitting the location information report, a reporting interval for transmitting the location information report, a time uncertainty allowance associated with transmitting the location information report at the reporting instances, or a response time requirement for a first reporting instance for transmitting a first location information report. In some aspects, the indication of the at least one of the measurement instance related information or the expiration time related information may indicate the expiration time related information. The expiration time related information may comprise at least one of an expiration time indicating a first expiration time after which the PRS should be measured for generating the location information report, or a second expiration time after the PRS is measured before which the location information report should be transmitted.

At 1008, the network entity may transmit PRS. The network entity may transmit PRS to the UE 1002. In some aspects, the network entity may cause or trigger the transmission of PRS to the UE 1002. In some aspects, the network entity may cause or trigger another network entity (e.g., base station 1004) to transmit PRS to the UE 1002. The UE 1002 may receive the PRS from the network entity.

At 1010, the UE 1002 may measure PRS. The UE 1002 may measure PRS received at the UE.

At 1012, the UE 1002 may generate the location information report. The UE 1002 may generate the location information report based on the PRS received at the UE. In some aspects, the location information report may be generated based on m samples of PRS resource instances within a PRS measurement window. Each sample of the m samples may be based on one PRS occasion within the PRS measurement window.

At 1014, the UE 1002 may provide the location information report. The UE 1002 may provide the location information report to the LMF 1005. The LMF 1005 may receive the location information report from the UE 1002. At least one of the measurement of the PRS, the generation of the location information report, or the transmission of the location information report may be based on the indication of the at least one of the measurement instance related information or the expiration time related information.

Figure 11:
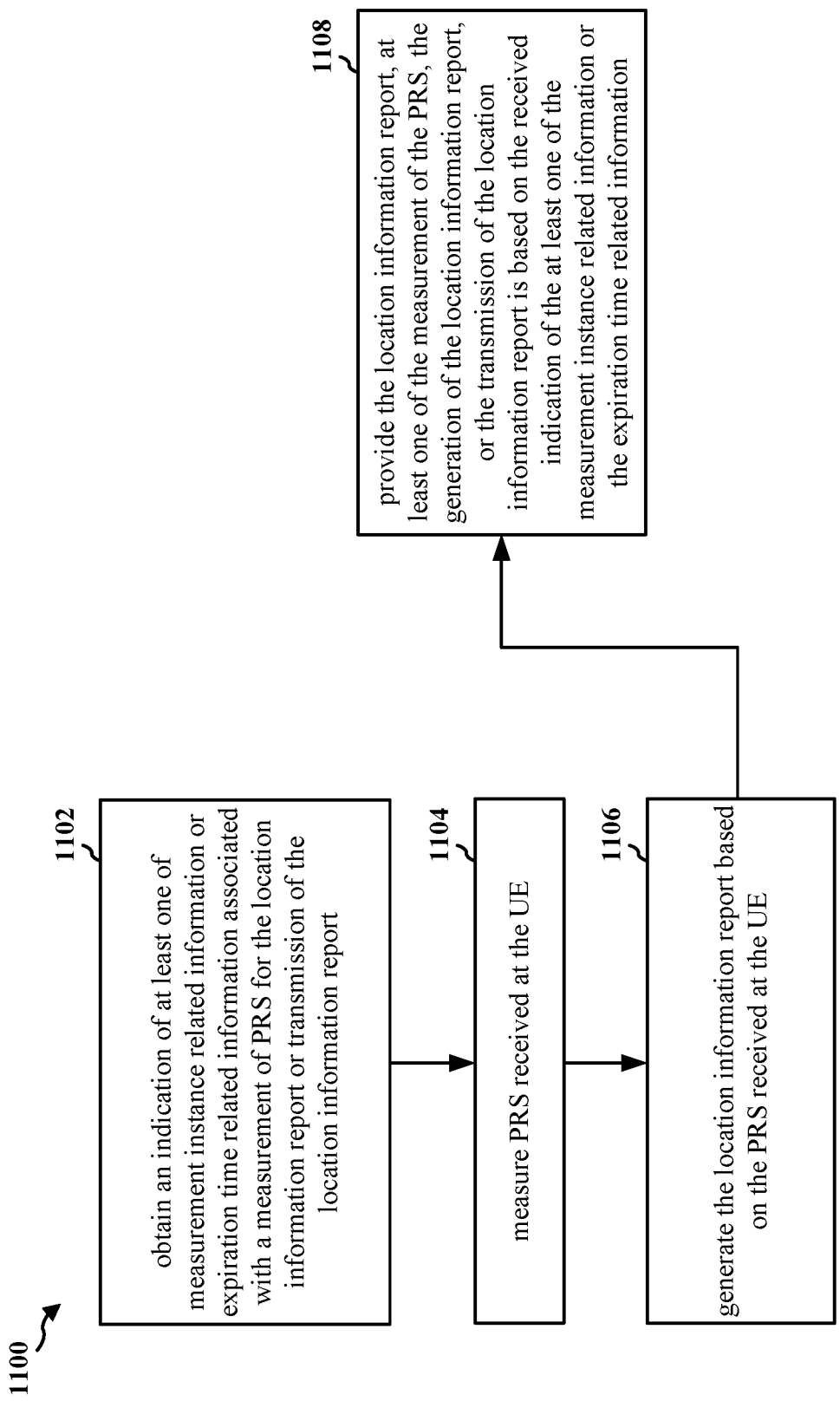
FIG. 11 is a flowchart of a method of wireless communication.

FIG. 11 is a flowchart 1100 of a method of wireless communication. The method may be performed by a UE or a component of a UE (e.g., the UE 104; the apparatus 1202; the baseband processor 1204, which may include the memory 360 and which may be the entire UE 350 or a component of the UE 350, such as the TX processor 368, the RX processor 356, and/or the controller/processor 359). One or more of the illustrated operations may be omitted, transposed, or contemporaneous. The method may allow a UE to provide a location information report comprising a measurement time, a measurement interval, or latency information related to PRS measurements.

At 1102, the UE may obtain a request for a location information report. For example, 1102 may be performed by request component 1240 of apparatus 1202. The UE may obtain the request for the location information report from an LMF via the base station. The request may include an indication of at least one of measurement instance related information or expiration time related information associated with a measurement of PRS for the location information report or transmission of the location information report. In some aspects, the indication of the at least one of the measurement instance related information or the expiration time related information may indicate the measurement instance related information. The measurement instance related information may comprise a first absolute measurement time instance for measuring a first received PRS and a measurement interval for measuring subsequently received PRS. In some aspects, the indication of the at least one of the measurement instance related information or the expiration time related information may indicate the measurement instance related information. The measurement instance related information may comprise a measurement interval for measuring the PRS. The measurement instance related information may further comprise a time range for a first absolute measurement time instance for measuring a first received PRS. In some aspects, the indication of the at least one of the measurement instance related information or the expiration time related information may indicate the measurement instance related information. The measurement instance related information may comprise at least one of a plurality of absolute measurement time instances for measuring the PRS or a plurality of measurement intervals for measuring the PRS. In some aspects, the indication of the at least one of the measurement instance related information or the expiration time related information may indicate the measurement instance related information. The measurement instance related information may comprise an allowed time uncertainty associated with one or more measurement instances for measuring the PRS. In some aspects, the indication of the at least one of the measurement instance related information or the expiration time related information may indicate the expiration time related information. The expiration time related information may comprise a latency requirement between a first time at which the PRS is measured and a second time subsequent to the first time. In some aspects, the second time may comprise one of a time at which the location information report is transmitted, the time at which the location information report reaches a location server client, or the time in which the location information report may be received at a base station. In some aspects, the indication of the at least one of the measurement instance related information or the expiration time related information may indicate the measurement instance related information. The measurement instance related information may comprise at least one of an absolute time of measurement instances for measuring the PRS, a measurement interval for measuring the PRS, a time uncertainty allowance associated with measuring the PRS at the measurement instances, or a response time requirement for a first measurement instance for measuring the PRS. In some aspects, the indication may further include report instance related information. The report instance related information may comprise at least one of an absolute time of reporting instances for transmitting the location information report, a reporting interval for transmitting the location information report, a time uncertainty allowance associated with transmitting the location information report at the reporting instances, or a response time requirement for a first reporting instance for transmitting a first location information report. In some aspects, the indication of the at least one of the measurement instance related information or the expiration time related information may indicate the expiration time related information. The expiration time related information may comprise at least one of an expiration time indicating a first expiration time after which the PRS should be measured for generating the location information report, or a second expiration time after the PRS is measured before which the location information report should be transmitted.

At 1104, the UE may measure PRS. For example, 1104 may be performed by PRS component 1242 of apparatus 1202. The UE may measure PRS received at the UE. The UE may receive PRS from the base station.

At 1106, the UE may generate the location information report. For example, 1106 may be performed by report component 1244 of apparatus 1202. The UE may generate the location information report based on the PRS received at the UE. In some aspects, the location information report may be generated based on m samples of PRS resource instances within a PRS measurement window. Each sample of the m samples may be based on one PRS occasion within the PRS measurement window.

At 1108, the UE may provide the location information report. For example, 1108 may be performed by report component 1244 of apparatus 1202. The UE may provide the location information report to the LMF, via the base station. At least one of the measurement of the PRS, the generation of the location information report, or the transmission of the location information report may be based on the indication of the at least one of the measurement instance related information or the expiration time related information.

Figure 12:
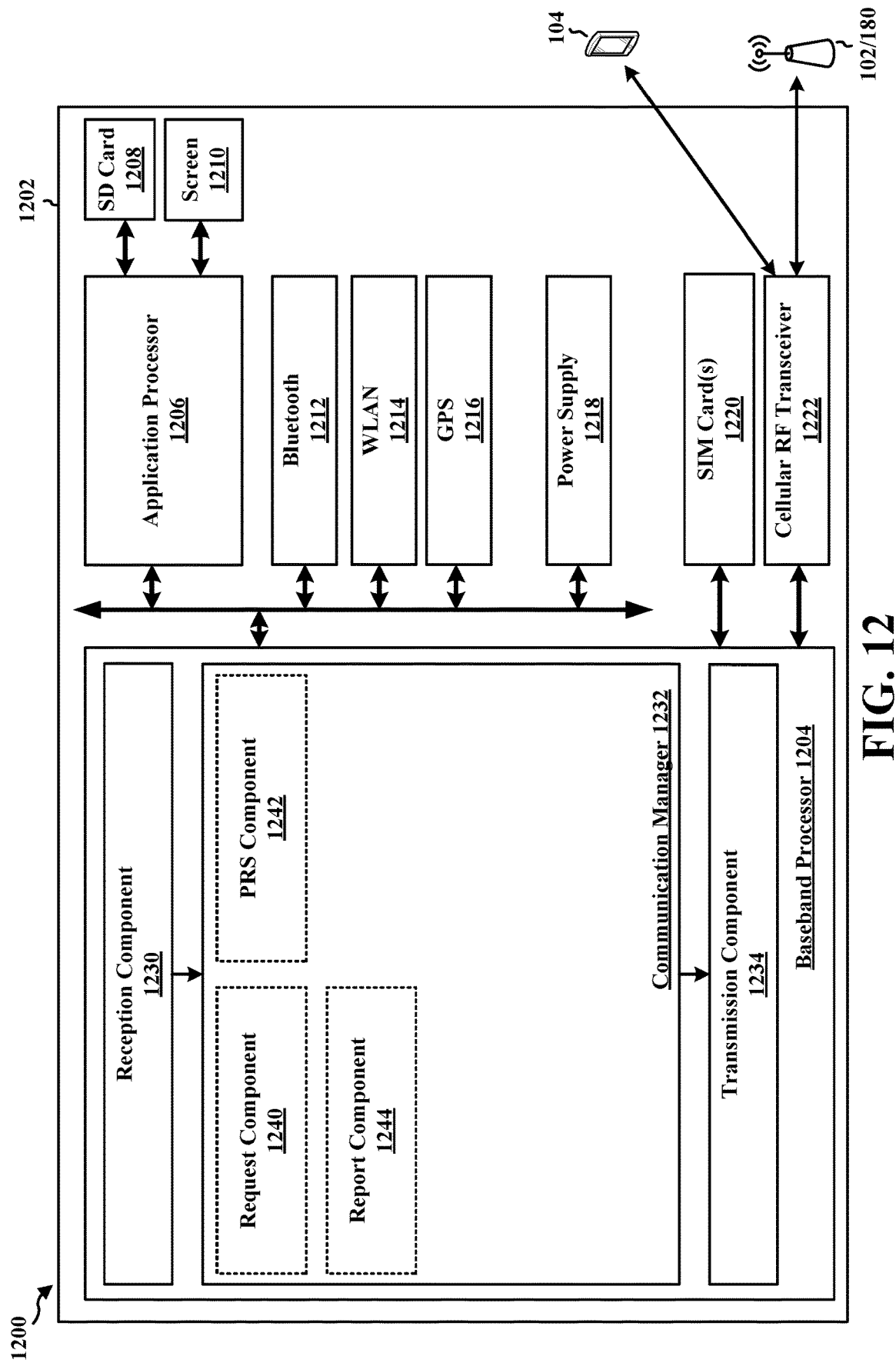
FIG. 12 is a diagram illustrating an example of a hardware implementation for an example apparatus.

FIG. 12 is a diagram 1200 illustrating an example of a hardware implementation for an apparatus 1202. The apparatus 1202 may be a UE, a component of a UE, or may implement UE functionality. In some aspects, the apparatus 1202 may include a baseband processor 1204 (also referred to as a modem) coupled to a cellular RF transceiver 1222. In some aspects, the apparatus 1202 may further include one or more subscriber identity modules (SIM) cards 1220, an application processor 1206 coupled to a secure digital (SD) card 1208 and a screen 1210, a Bluetooth module 1212, a wireless local area network (WLAN) module 1214, a Global Positioning System (GPS) module 1216, or a power supply 1218. In some aspects, the baseband processor 1204 may comprise a cellular baseband processor that communicates through the cellular RF transceiver 1222 with the UE 104 and/or BS 102/180. In some aspects, the baseband processor 1204 may comprise a processor or a non-cellular baseband processor. The baseband processor 1204 may include a computer-readable medium/memory. The computer-readable medium/memory may be non-transitory. The baseband processor 1204 is responsible for general processing, including the execution of software stored on the computer-readable medium/memory. The software, when executed by the baseband processor 1204, causes the baseband processor 1204 to perform the various functions described supra. The computer-readable medium/memory may also be used for storing data that is manipulated by the baseband processor 1204 when executing software. The baseband processor 1204 further includes a reception component 1230, a communication manager 1232, and a transmission component 1234. The communication manager 1232 includes the one or more illustrated components. The components within the communication manager 1232 may be stored in the computer-readable medium/memory and/or configured as hardware within the baseband processor 1204. The baseband processor 1204 may be a component of the UE 350 and may include the memory 360 and/or at least one of the TX processor 368, the RX processor 356, and the controller/processor 359. In one configuration, the apparatus 1202 may be a modem chip and include just the baseband processor 1204, and in another configuration, the apparatus 1202 may be the entire UE (e.g., see 350 of FIG. 3) and include the additional modules of the apparatus 1202.

The communication manager 1232 includes a request component 1240 that is configured to obtain a request for a location information report, e.g., as described in connection with 1102 of FIG. 11. The communication manager 1232 further includes a PRS component 1242 that is configured to measure PRS received at the UE, e.g., as described in connection with 1104 of FIG. 11. The communication manager 1232 further includes a report component 1244 that is configured to generate the location information report, e.g., as described in connection with 1106 of FIG. 11. The report component 1244 may be further configured to provide the location information report, e.g., as described in connection with 1108 of FIG. 11.

The apparatus may include additional components that perform each of the blocks of the algorithm in the flowchart of FIG. 11. As such, each block in the flowchart of FIG. 11 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

As shown, the apparatus 1202 may include a variety of components configured for various functions. In one configuration, the apparatus 1202, and in particular the baseband processor 1204, includes means for receiving a request for a location information report. The request including an indication of at least one of measurement instance related information or expiration time related information associated with a measurement of PRS for the location information report or transmission of the location information report. The apparatus includes means for measuring PRS received at the UE. The apparatus includes means for generating the location information report based on the measured PRS. The apparatus includes means for transmitting the location information report. At least one of the measurement of the PRS, the generation of the location information report, or the transmission of the location information report is based on the received indication of the at least one of the measurement instance related information or the expiration time related information. The means may be one or more of the components of the apparatus 1202 configured to perform the functions recited by the means. As described supra, the apparatus 1202 may include the TX Processor 368, the RX Processor 356, and the controller/processor 359. As such, in one configuration, the means may be the TX Processor 368, the RX Processor 356, and the controller/processor 359 configured to perform the functions recited by the means.

Figure 13:
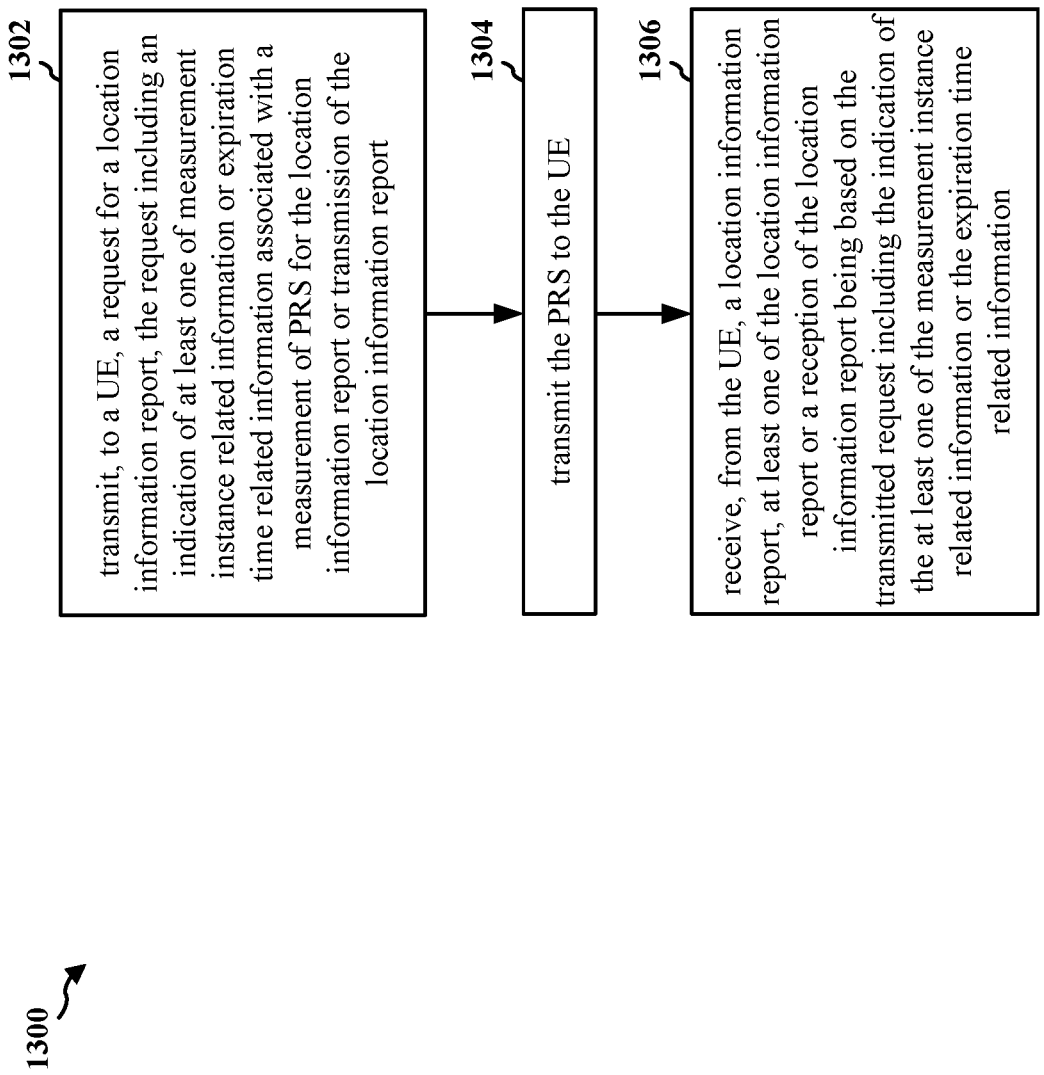
FIG. 13 is a flowchart of a method of wireless communication.

FIG. 13 is a flowchart 1300 of a method of wireless communication. The method may be performed by a network entity (e.g., LMF) or a component of a network entity (e.g., the LMF 191; the apparatus 1402; the baseband unit 1404). One or more of the illustrated operations may be omitted, transposed, or contemporaneous. The method may allow a network entity (e.g., LMF) to request a UE to provide a location information report comprising a measurement time, a measurement interval, or latency information related to PRS measurements.

At 1302, the network entity (e.g., LMF) may transmit a request for a location information report. For example, 1302 may be performed by request component 1440 of apparatus 1402. The LMF may transmit, via a base station, the request for the location information report to the UE. The request may include an indication of at least one of measurement instance related information or expiration time related information associated with a measurement of PRS for the location information report or transmission of the location information report. In some aspects, the indication of the at least one of the measurement instance related information or the expiration time related information may indicate the measurement instance related information. The measurement instance related information may comprise a first absolute measurement time instance for measuring a first received PRS and a measurement interval for measuring subsequently received PRS. In some aspects, the indication of the at least one of the measurement instance related information or the expiration time related information may indicate the measurement instance related information. The measurement instance related information may comprise a measurement interval for measuring the PRS. The measurement instance related information may further comprise a time range for a first absolute measurement time instance for measuring a first received PRS. In some aspects, the indication of the at least one of the measurement instance related information or the expiration time related information may indicate the measurement instance related information. The measurement instance related information may comprise at least one of a plurality of absolute measurement time instances for measuring the PRS or a plurality of measurement intervals for measuring the PRS. In some aspects, the indication of the at least one of the measurement instance related information or the expiration time related information may indicate the measurement instance related information. The measurement instance related information may comprise an allowed time uncertainty associated with one or more measurement instances for measuring the PRS. In some aspects, the indication of the at least one of the measurement instance related information or the expiration time related information may indicate the expiration time related information. The expiration time related information may comprise a latency requirement between a first time at which the PRS is measured and a second time subsequent to the first time. In some aspects, the second time may comprise one of a time at which the location information report is transmitted, the time at which the location information report reaches a location server client, or the time in which the location information report is received at a base station. In some aspects, the indication of the at least one of the measurement instance related information or the expiration time related information may indicate the measurement instance related information. The measurement instance related information may comprise at least one of an absolute time of measurement instances for measuring the PRS, a measurement interval for measuring the PRS, a time uncertainty allowance associated with measuring the PRS at the measurement instances, or a response time requirement for a first measurement instance for measuring the PRS. In some aspects, the indication may further include report instance related information. The report instance related information may comprise at least one of an absolute time of reporting instances for transmitting the location information report, a reporting interval for transmitting the location information report, a time uncertainty allowance associated with transmitting the location information report at the reporting instances, or a response time requirement for a first reporting instance for transmitting a first location information report. In some aspects, the indication of the at least one of the measurement instance related information or the expiration time related information may indicate the expiration time related information. The expiration time related information may comprise at least one of an expiration time indicating a first expiration time after which the PRS should be measured for generating the location information report, or a second expiration time after the PRS is measured before which the location information report should be transmitted.

At 1304, the network entity may transmit PRS. For example, 1304 may be performed by PRS component 1442 of apparatus 1402. The network entity may initiate or trigger the transmission of the PRS. The network entity may initiate or trigger another network entity to transmit the PRS. For example, the base station may transmit PRS to the UE.

At 1306, the network entity may receive the location information report. For example, 1306 may be performed by report component 1444 of apparatus 1402. The LMF may receive the location information report from the UE. The LMF may receive the location information report from the UE via the base station. At least one of the location information report or a reception of the location information report may be based on the request including the indication of the at least one of the measurement instance related information or the expiration time related information. In some aspects, the location information report may be generated based on m samples of PRS resource instances within a PRS measurement window. Each sample of the m samples may be based on one PRS occasion within the PRS measurement window.

Figure 14:
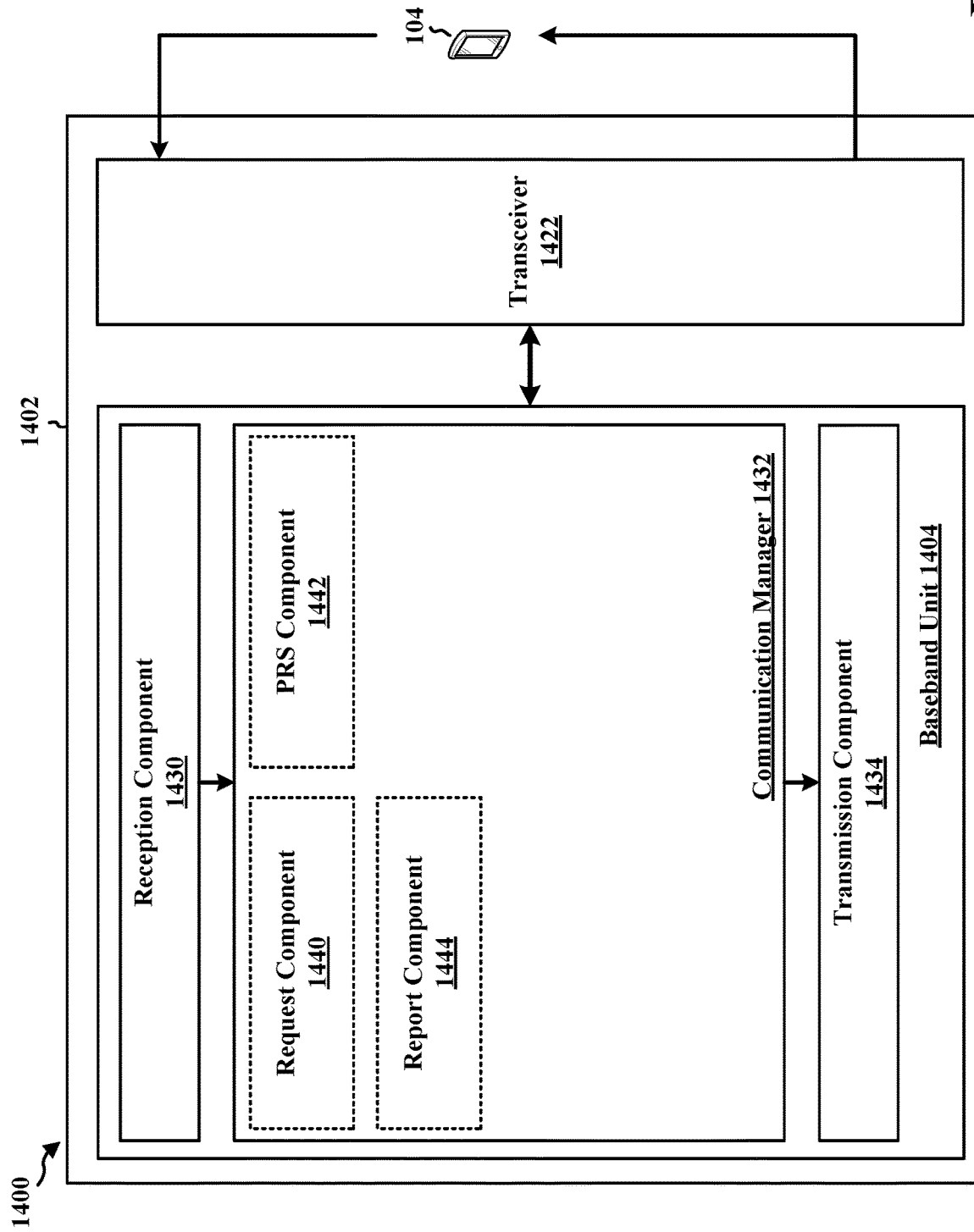
FIG. 14 is a diagram illustrating an example of a hardware implementation for an example apparatus.

FIG. 14 is a diagram 1400 illustrating an example of a hardware implementation for an apparatus 1402. The apparatus 1402 may be a network entity, a component of a network entity, or may implement network entity functionality. In some aspects, the network entity may comprise at least an LMF. In some aspects, the apparatus 1402 may include a baseband unit 1404. The baseband unit 1404 may communicate through a transceiver 1422 with the UE 104. The baseband unit 1404 may include a computer-readable medium/memory. The baseband unit 1404 is responsible for general processing, including the execution of software stored on the computer-readable medium/memory. The software, when executed by the baseband unit 1404, causes the baseband unit 1404 to perform the various functions described supra. The computer-readable medium/memory may also be used for storing data that is manipulated by the baseband unit 1404 when executing software. The baseband unit 1404 further includes a reception component 1430, a communication manager 1432, and a transmission component 1434. The communication manager 1432 includes the one or more illustrated components. The components within the communication manager 1432 may be stored in the computer-readable medium/memory and/or configured as hardware within the baseband unit 1404.

The communication manager 1432 includes a request component 1440 that may transmit a request for a location information report, e.g., as described in connection with 1302 of FIG. 13. The communication manager 1432 further includes a PRS component 1442 that may transmit PRS to the UE, e.g., as described in connection with 1304 of FIG. 13. The communication manager 1432 further includes a report component 1444 that may receive the location information report, e.g., as described in connection with 1306 of FIG. 13.

The apparatus may include additional components that perform each of the blocks of the algorithm in the flowchart of FIG. 13. As such, each block in the flowchart of FIG. 13 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

As shown, the apparatus 1402 may include a variety of components configured for various functions. In one configuration, the apparatus 1402, and in particular the baseband unit 1404, includes means for transmitting, to a UE, a request for a location information report. The request including an indication of at least one of measurement instance related information or expiration time related information associated with a measurement of PRS for the location information report or transmission of the location information report. The apparatus includes means for transmitting the PRS to the UE. The apparatus includes means for receiving, from the UE, the location information report. At least one of the location information report or a reception of the location information report being based on the request including the indication of the at least one of the measurement instance related information or the expiration time related information. The means may be one or more of the components of the apparatus 1402 configured to perform the functions recited by the means. As described supra, the apparatus 1402 may include the TX Processor 316, the RX Processor 370, and the controller/processor 375. As such, in one configuration, the means may be the TX Processor 316, the RX Processor 370, and the controller/processor 375 configured to perform the functions recited by the means.

It is understood that the specific order or hierarchy of blocks in the processes/flowcharts disclosed is an illustration of example approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Terms such as "if," "when," and "while" should be interpreted to mean "under the condition that" rather than imply an immediate temporal relationship or reaction. That is, these phrases, e.g., "when," do not imply an immediate action in response to or during the occurrence of an action, but simply imply that if a condition is met then an action will occur, but without requiring a specific or immediate time constraint for the action to occur. The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

The following aspects are illustrative only and may be combined with other aspects or teachings described herein, without limitation.

Aspect 1 is an apparatus for wireless communication at a UE including at least one processor coupled to a memory and at least one transceiver and configured to obtain an indication of at least one of measurement instance related information or expiration time related information associated with a measurement of PRS for the location information report or transmission of the location information report; generate the location information report based on a PRS received at the UE; and provide the location information report, wherein at least one of measurement of the PRS, generation of the location information report, or the transmission of the location information report is based on the indication of the at least one of the measurement instance related information or the expiration time related information.

Aspect 2 is the apparatus of aspect 1, further includes that the indication of the at least one of the measurement instance related information or the expiration time related information indicates the measurement instance related information, and the measurement instance related information comprises a first absolute measurement time instance for measuring a first received PRS and a measurement interval for measuring subsequently received PRS.

Aspect 3 is the apparatus of any of aspects 1 and 2, further includes that the indication of the at least one of the measurement instance related information or the expiration time related information indicates the measurement instance related information, and the measurement instance related information comprises a measurement interval for measuring the PRS.

Aspect 4 is the apparatus of any of aspects 1-3, further includes that the measurement instance related information further comprises a time range for a first absolute measurement time instance for measuring a first received PRS.

Aspect 5 is the apparatus of any of aspects 1-4, further includes that the indication of the at least one of the measurement instance related information or the expiration time related information indicates the measurement instance related information, and the measurement instance related information comprises at least one of a plurality of absolute measurement time instances for measuring the PRS or a plurality of measurement intervals for measuring the PRS.

Aspect 6 is the apparatus of any of aspects 1-5, further includes that the indication of the at least one of the measurement instance related information or the expiration time related information indicates the measurement instance related information, and the measurement instance related information comprises an allowed time uncertainty associated with one or more measurement instances for measuring the PRS.

Aspect 7 is the apparatus of any of aspects 1-6, further includes that the indication of the at least one of the measurement instance related information or the expiration time related information indicates the expiration time related information, and the expiration time related information comprises a latency requirement between a first time at which the PRS is measured and a second time subsequent to the first time.

Aspect 8 is the apparatus of any of aspects 1-7, further includes that the second time is one of a time at which the location information report is transmitted, the time at which the location information report reaches a location server client, or the time in which the location information report is received at a base station.

Aspect 9 is the apparatus of any of aspects 1-8, further includes that the indication of the at least one of the measurement instance related information or the expiration time related information indicates the measurement instance related information, and the measurement instance related information comprises at least one of an absolute time of measurement instances for measuring the PRS, a measurement interval for measuring the PRS, a time uncertainty allowance associated with measuring the PRS at the measurement instances, or a response time requirement for a first measurement instance for measuring the PRS.

Aspect 10 is the apparatus of any of aspects 1-9, further includes that the indication further includes report instance related information, and the report instance related information comprises at least one of an absolute time of reporting instances for transmitting the location information report, a reporting interval for transmitting the location information report, a time uncertainty allowance associated with transmitting the location information report at the reporting instances, or a response time requirement for a first reporting instance for transmitting a first location information report.

Aspect 11 is the apparatus of any of aspects 1-10, further includes that the indication of the at least one of the measurement instance related information or the expiration time related information indicates the expiration time related information, and the expiration time related information comprises at least one of an expiration time indicating a first expiration time after which the PRS should be measured for generating the location information report, or a second expiration time after the PRS is measured before which the location information report should be transmitted.

Aspect 12 is the apparatus of any of aspects 1-11, further includes that the location information report is generated based on m samples of PRS resource instances within a PRS measurement window, each sample of them samples being based on one PRS occasion within the PRS measurement window.

Aspect 13 is a method of wireless communication for implementing any of aspects 1-12.

Aspect 14 is an apparatus for wireless communication including means for implementing any of aspects 1-12.

Aspect 15 is a computer-readable medium storing computer executable code, where the code when executed by a processor causes the processor to implement any of aspects 1-12.

Aspect 16 is an apparatus for wireless communication at a network entity including at least one processor coupled to a memory and at least one transceiver and configured to transmit, to a UE, a request for a location information report, the request including an indication of at least one of measurement instance related information or expiration time related information associated with a measurement of PRS for the location information report or transmission of the location information report; transmit the PRS to the UE; and receive, from the UE, the location information report, at least one of the location information report or a reception of the location information report being based on the request including the indication of the at least one of the measurement instance related information or the expiration time related information.

Aspect 17 is the apparatus of aspect 16, further includes that the indication of the at least one of the measurement instance related information or the expiration time related information indicates the measurement instance related information, and the measurement instance related information comprises a first absolute measurement time instance for measuring first received PRS and a measurement interval for measuring subsequently received PRS.

Aspect 18 is the apparatus of any of aspects 16 and 17, further includes that the indication of the at least one of the measurement instance related information or the expiration time related information indicates the measurement instance related information, and the measurement instance related information comprises a measurement interval for measuring the PRS.

Aspect 19 is the apparatus of any of aspects 16-18, further includes that the measurement instance related information further comprises a time range for a first absolute measurement time instance for measuring a first received PRS.

Aspect 20 is the apparatus of any of aspects 16-19, further includes that the indication of the at least one of the measurement instance related information or the expiration time related information indicates the measurement instance related information, and the measurement instance related information comprises at least one of a plurality of absolute measurement time instances for measuring the PRS or a plurality of measurement intervals for measuring the PRS.

Aspect 21 is the apparatus of any of aspects 16-20, further includes that the indication of the at least one of the measurement instance related information or the expiration time related information indicates the measurement instance related information, and the measurement instance related information comprises an allowed time uncertainty associated with one or more measurement instances for measuring the PRS.

Aspect 22 is the apparatus of any of aspects 16-21, further includes that the indication of the at least one of the measurement instance related information or the expiration time related information indicates the expiration time related information, and the expiration time related information comprises a latency requirement between a first time at which the PRS is measured and a second time subsequent to the first time.

Aspect 23 is the apparatus of any of aspects 16-22, further includes that the second time is one of a time at which the location information report is transmitted, the time at which the location information report reaches a location server client, or the time in which the location information report is received at a base station.

Aspect 24 is the apparatus of any of aspects 16-23, further includes that the indication of the at least one of the measurement instance related information or the expiration time related information indicates the measurement instance related information, and the measurement instance related information comprises at least one of an absolute time of measurement instances for measuring the PRS, a measurement interval for measuring the PRS, a time uncertainty allowance associated with measuring the PRS at the measurement instances, or a response time requirement for a first measurement instance for measuring the PRS.

Aspect 25 is the apparatus of any of aspects 16-24, further includes that the indication further includes report instance related information, and the report instance related information comprises at least one of an absolute time of reporting instances for transmitting the location information report, a reporting interval for transmitting the location information report, a time uncertainty allowance associated with transmitting the location information report at the reporting instances, or a response time requirement for a first reporting instance for transmitting a first location information report.

Aspect 26 is the apparatus of any of aspects 16-25, further includes that the indication of the at least one of the measurement instance related information or the expiration time related information indicates the expiration time related information, and the expiration time related information comprises at least one of an expiration time indicating a first expiration time after which the PRS should be measured for generating the location information report, or a second expiration time after the PRS is measured before which the location information report should be transmitted.

Aspect 27 is the apparatus of any of aspects 16-26, further includes that the location information report is generated based on m samples of PRS resource instances within a PRS measurement window, each sample of the m samples being based on one PRS occasion within the PRS measurement window.

Aspect 28 is a method of wireless communication for implementing any of aspects 16-27.

Aspect 29 is an apparatus for wireless communication including means for implementing any of aspects 16-27.

Aspect 30 is a computer-readable medium storing computer executable code, where the code when executed by a processor causes the processor to implement any of aspects 16-27.

What is claimed is:

1. An apparatus for wireless communication at a user equipment (UE), comprising:
    memory;
    at least one transceiver; and
    at least one processor, communicatively connected to the memory and the at least one transceiver, the at least one processor configured to:
        obtain an indication of at least one of measurement instance related information or expiration time related information associated with a measurement of positioning reference signals (PRS) for a location information report or transmission of the location information report, wherein the indication of the at least one of the measurement instance related information or the expiration time related information is based on a latency condition of a location server client associated with a location management function (LMF) coordinating the transmission of the location information report;
        generate the location information report based on a PRS received at the UE; and
        provide the location information report, wherein at least one of measurement of the PRS, generation of the location information report, or the transmission of the location information report is based on the indication of the at least one of the measurement instance related information or the expiration time related information.

2. The apparatus of claim 1, wherein the indication of the at least one of the measurement instance related information or the expiration time related information indicates the measurement instance related information, and the measurement instance related information comprises a first absolute measurement time instance for measuring a first received PRS and a measurement interval for measuring subsequently received PRS.

3. The apparatus of claim 1, wherein the indication of the at least one of the measurement instance related information or the expiration time related information indicates the measurement instance related information, and the measurement instance related information comprises a measurement interval for measuring the PRS.

4. The apparatus of claim 3, wherein the measurement instance related information further comprises a time range for a first absolute measurement time instance for measuring a first received PRS.

5. The apparatus of claim 1, wherein the indication of the at least one of the measurement instance related information or the expiration time related information indicates the measurement instance related information, and the measurement instance related information comprises at least one of a plurality of absolute measurement time instances for measuring the PRS or a plurality of measurement intervals for measuring the PRS.

6. The apparatus of claim 1, wherein the indication of the at least one of the measurement instance related information or the expiration time related information indicates the measurement instance related information, and the measurement instance related information comprises an allowed time uncertainty associated with one or more measurement instances for measuring the PRS.

7. The apparatus of claim 1, wherein the indication of the at least one of the measurement instance related information or the expiration time related information indicates the expiration time related information, and the expiration time related information comprises a latency requirement between a first time at which the PRS is measured and a second time subsequent to the first time.

8. The apparatus of claim 7, wherein the second time is one of a time at which the location information report is transmitted, the time at which the location information report reaches the location server client, or the time in which the location information report is received at a base station.

9. The apparatus of claim 1, wherein the indication of the at least one of the measurement instance related information or the expiration time related information indicates the measurement instance related information, and the measurement instance related information comprises at least one of an absolute time of measurement instances for measuring the PRS, a measurement interval for measuring the PRS, a time uncertainty allowance associated with measuring the PRS at the measurement instances, or a response time requirement for a first measurement instance for measuring the PRS.

10. The apparatus of claim 1, wherein the indication further includes report instance related information, and the report instance related information comprises at least one of an absolute time of reporting instances for transmitting the location information report, a reporting interval for transmitting the location information report, a time uncertainty allowance associated with transmitting the location information report at the reporting instances, or a response time requirement for a first reporting instance for transmitting a first location information report.

11. The apparatus of claim 1, wherein the indication of the at least one of the measurement instance related information or the expiration time related information indicates the expiration time related information, and the expiration time related information comprises at least one of an expiration time indicating a first expiration time after which the PRS should be measured for generating the location information report, or a second expiration time after the PRS is measured before which the location information report should be transmitted.

12. The apparatus of claim 1, wherein the location information report is generated based on m samples of PRS resource instances within a PRS measurement window, each sample of the m samples being based on one PRS occasion within the PRS measurement window.

13. A method of wireless communication at a user equipment (UE), comprising:
obtain an indication of at least one of measurement instance related information or expiration time related information associated with a measurement of positioning reference signals (PRS) for a location information report or transmission of the location information report, wherein the indication of the at least one of the measurement instance related information or the expiration time related information is based on a latency condition of a location server client associated with a location management function (LMF) coordinating the transmission of the location information report;
generating the location information report based on a PRS received at the UE; and
providing the location information report, wherein at least one of the measurement of the PRS, generation of the location information report, or the transmission of the location information report is based on the indication of the at least one of the measurement instance related information or the expiration time related information.

14. The method of claim 13, wherein the indication of the at least one of the measurement instance related information or the expiration time related information indicates the measurement instance related information, and the measurement instance related information comprises a first absolute measurement time instance for measuring first received PRS and a measurement interval for measuring subsequently received PRS.

15. The method of claim 13, wherein the indication of the at least one of the measurement instance related information or the expiration time related information indicates the measurement instance related information, and the measurement instance related information comprises a measurement interval for measuring the PRS.

16. An apparatus for wireless communication at a network entity, comprising:
memory;
at least one transceiver; and
at least one processor, communicatively connected to the memory and the at least one transceiver, the at least one processor configured to:
transmit, to a user equipment (UE), a request for a location information report, the request including an indication of at least one of measurement instance related information or expiration time related information associated with a measurement of positioning reference signals (PRS) for the location information report or transmission of the location information report, wherein the indication of the at least one of the measurement instance related information or the expiration time related information is based on a latency condition of a location server client associated with the network entity;
transmit the PRS to the UE; and
receive, from the UE, the location information report, at least one of the location information report or a reception of the location information report being based on the request including the indication of the at least one of the measurement instance related information or the expiration time related information.

17. The apparatus of claim 16, wherein the indication of the at least one of the measurement instance related information or the expiration time related information indicates the measurement instance related information, and the measurement instance related information comprises a first absolute measurement time instance for measuring first received PRS and a measurement interval for measuring subsequently received PRS.

18. The apparatus of claim 16, wherein the indication of the at least one of the measurement instance related information or the expiration time related information indicates the measurement instance related information, and the measurement instance related information comprises a measurement interval for measuring the PRS.

19. The apparatus of claim 18, wherein the measurement instance related information further comprises a time range for a first absolute measurement time instance for measuring a first received PRS.

20. The apparatus of claim 16, wherein the indication of the at least one of the measurement instance related information or the expiration time related information indicates the measurement instance related information, and the measurement instance related information comprises at least one of a plurality of absolute measurement time instances for measuring the PRS or a plurality of measurement intervals for measuring the PRS.

21. The apparatus of claim 16, wherein the indication of the at least one of the measurement instance related information or the expiration time related information indicates the measurement instance related information, and the measurement instance related information comprises an allowed time uncertainty associated with one or more measurement instances for measuring the PRS.

22. The apparatus of claim 16, wherein the indication of the at least one of the measurement instance related information or the expiration time related information indicates the expiration time related information, and the expiration time related information comprises a latency requirement between a first time at which the PRS is measured and a second time subsequent to the first time.

23. The apparatus of claim 22, wherein the second time is one of a time at which the location information report is transmitted, the time at which the location information report reaches the location server client, or the time in which the location information report is received at a base station.

24. The apparatus of claim 16, wherein the indication of the at least one of the measurement instance related information or the expiration time related information indicates the measurement instance related information, and the measurement instance related information comprises at least one of an absolute time of measurement instances for measuring the PRS, a measurement interval for measuring the PRS, a time uncertainty allowance associated with measuring the PRS at the measurement instances, or a response time requirement for a first measurement instance for measuring the PRS.

25. The apparatus of claim 16, wherein the indication further includes report instance related information, and the report instance related information comprises at least one of an absolute time of reporting instances for transmitting the location information report, a reporting interval for transmitting the location information report, a time uncertainty allowance associated with transmitting the location information report at the reporting instances, or a response time requirement for a first reporting instance for transmitting a first location information report.

26. The apparatus of claim 16, wherein the indication of the at least one of the measurement instance related information or the expiration time related information indicates the expiration time related information, and the expiration time related information comprises at least one of an expiration time indicating a first expiration time after which the PRS should be measured for generating the location information report, or a second expiration time after the PRS is measured before which the location information report should be transmitted.

27. The apparatus of claim 16, wherein the location information report is generated based on m samples of PRS resource instances within a PRS measurement window, each sample of the m samples being based on one PRS occasion within the PRS measurement window.

28. A method of wireless communication at a network entity, comprising:
   transmitting, to a user equipment (UE), a request for a location information report, the request including an indication of at least one of measurement instance related information or expiration time related information associated with a measurement of positioning reference signals (PRS) for the location information report or transmission of the location information report, wherein the indication of the at least one of the measurement instance related information or the expiration time related information is based on a latency condition of a location server client associated with the network entity;
   transmitting the PRS to the UE; and
   receiving, from the UE, the location information report, at least one of the location information report or a reception of the location information report being based on the request including the indication of the at least one of the measurement instance related information or the expiration time related information.

29. The method of claim 28, wherein the indication of the at least one of the measurement instance related information or the expiration time related information indicates the measurement instance related information, and the measurement instance related information comprises a first absolute measurement time instance for measuring first received PRS and a measurement interval for measuring subsequently received PRS.

30. The method of claim 28, wherein the indication of the at least one of the measurement instance related information or the expiration time related information indicates the measurement instance related information, and the measurement instance related information comprises a measurement interval for measuring the PRS.

* * * * *